US011512585B2

(12) United States Patent
Young et al.

(10) Patent No.: US 11,512,585 B2
(45) Date of Patent: Nov. 29, 2022

(54) REENTRY AND/OR REDRILLING RANGING USING FOCUSED ELECTRODE VIRTUAL SETS AND SIMULATED ROTATION

(71) Applicant: Halliburton Energy Services, Inc., Houston, TX (US)

(72) Inventors: Joseph Keith Young, Houston, TX (US); Hsu-Hsiang Wu, Sugar Land, TX (US); Paul Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 152 days.

(21) Appl. No.: 16/629,240

(22) PCT Filed: Nov. 2, 2018

(86) PCT No.: PCT/US2018/058843
§ 371 (c)(1),
(2) Date: Jan. 7, 2020

(87) PCT Pub. No.: WO2019/094272
PCT Pub. Date: May 16, 2019

(65) Prior Publication Data
US 2020/0263534 A1    Aug. 20, 2020

Related U.S. Application Data

(60) Provisional application No. 62/582,673, filed on Nov. 7, 2017.

(51) Int. Cl.
*E21B 47/09* (2012.01)
*E21B 47/0228* (2012.01)
(Continued)

(52) U.S. Cl.
CPC ............ *E21B 47/09* (2013.01); *E21B 47/024* (2013.01); *E21B 47/0228* (2020.05); *G01V 3/26* (2013.01); *G01V 3/38* (2013.01)

(58) Field of Classification Search
CPC .... E21B 47/09; E21B 47/0228; E21B 47/024; G01V 3/26; G01V 3/38; G01V 3/34
See application file for complete search history.

(56) References Cited

U.S. PATENT DOCUMENTS

2004/0245991 A1\* 12/2004 Hayman .................. G01V 3/24
324/374
2015/0268371 A1\* 9/2015 Donderici ........... E21B 47/0228
324/346
(Continued)

FOREIGN PATENT DOCUMENTS

WO    WO-2015084979 A1 \*  6/2015    ........... B01D 46/543
WO    WO 2017/139058 A1    8/2017
WO    WO 2018/052453 A1    3/2018

OTHER PUBLICATIONS

International Search Report and the Written Opinion of the International Search Authority, or the Declaration, dated Feb. 21, 2019, PCT/US2018/058843, 11 pages, ISA/KR.

*Primary Examiner* — Catherine T. Rastovski
*Assistant Examiner* — Kaleria Knox
(74) *Attorney, Agent, or Firm* — Benjamin Ford; C. Tumey Law Group PLLC

(57) ABSTRACT

A ranging system and method to determine a relative distance and direction of a target borehole relative to a second borehole using a ranging tool that can make ranging measurements while the ranging tool is not rotating. An array of button electrodes included in the ranging tool can be fired in a sequential fashion so as to simulate rotation of one or more button electrodes, without the ranging tool rotating. The array of button electrodes can also be fired in a sequential fashion so as to simulate rotational and/or longitudinal movement of the ranging tool.

19 Claims, 12 Drawing Sheets

(51) Int. Cl.
*E21B 47/024* (2006.01)
*G01V 3/26* (2006.01)
*G01V 3/38* (2006.01)

(56) References Cited

U.S. PATENT DOCUMENTS

2015/0378043 A1 12/2015 Brooks
2016/0041296 A1 2/2016 Ahmad et al.
2016/0216397 A1 7/2016 Donderici et al.
2016/0258276 A1 9/2016 Donderici et al.

* cited by examiner

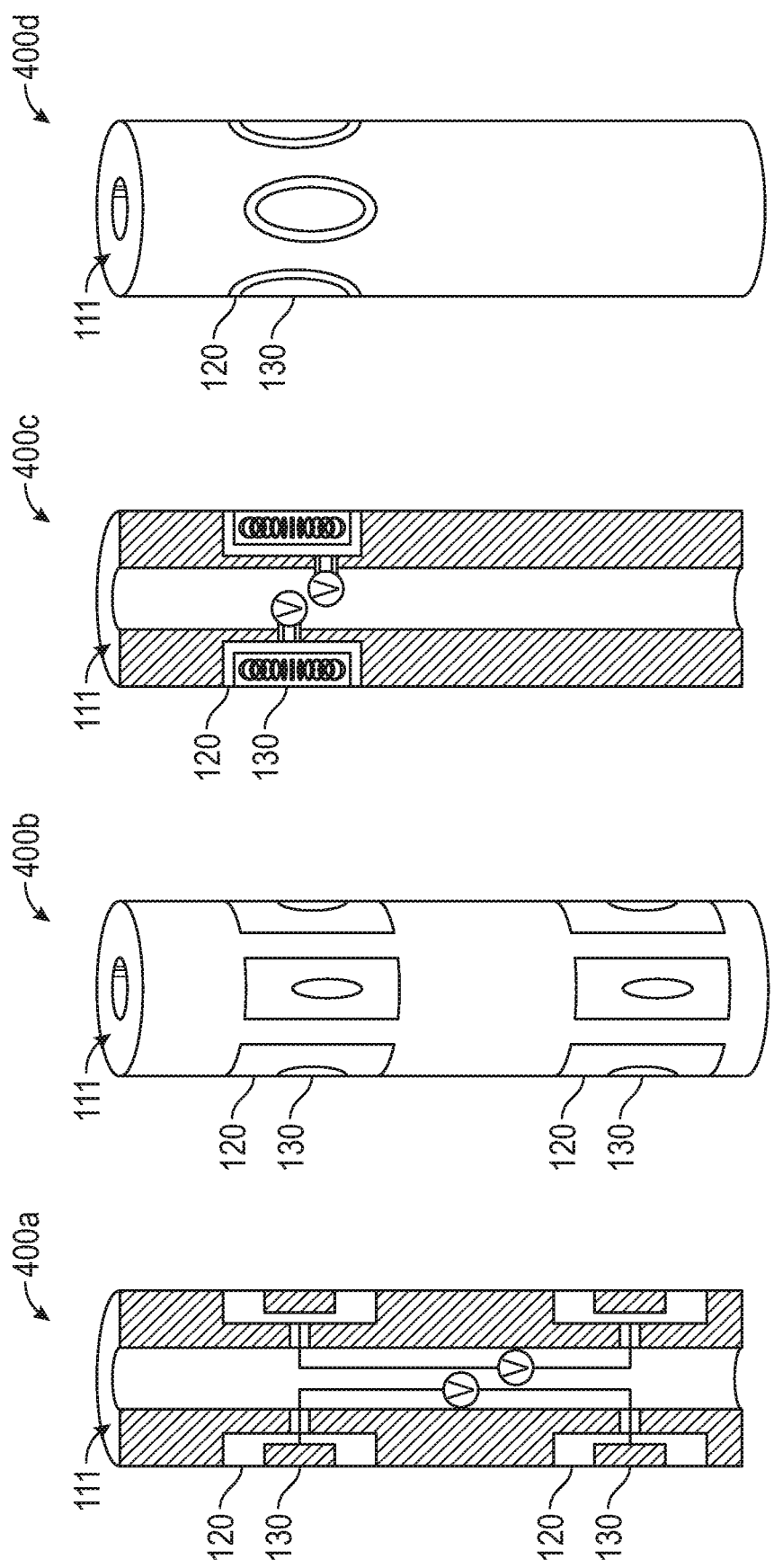

REENTRY AND/OR REDRILLING RANGING USING FOCUSED ELECTRODE VIRTUAL SETS AND SIMULATED ROTATION

PRIORITY

The present application is a U.S. National Stage Patent Application of International Patent Application No. PCT/US2018/058843, filed Nov. 2, 2018, which claims priority to U.S. Provisional Application No. 62/582,673, filed on Nov. 7, 2017, having the same title, the benefit of which is claimed and the disclosure of which is incorporated herein by reference in its entirety.

TECHNICAL FIELD

The present disclosure generally relates to oilfield equipment and, in particular, to downhole tools, drilling and related systems and techniques for ranging target wellbores. More particularly still, the present disclosure relates to methods and systems for determining the position, direction, and orientation of a conductive pipe (e.g. a tubing string) relative to another wellbore being drilled.

BACKGROUND

Hydrocarbons, such as oil and gas, are commonly obtained from subterranean formations that may be located onshore or offshore. The development of subterranean operations and the processes involved in removing hydrocarbons from a subterranean formation can be complex. Typically, subterranean operations involve a number of different operations such as, for example, drilling a wellbore at a desired well site, treating the wellbore to optimize production of hydrocarbons, and performing the necessary operations to produce and process the hydrocarbons from the subterranean formation.

Ranging tools are used to determine the position, direction, and orientation of a conductive pipe (for example, a metallic casing) for a variety of applications. In certain instances, such as in a blowout, it may be necessary to intersect a first well, called a target well, with a second well, called a relief well. The second well may be drilled for the purpose of intersecting the target well, for example, to relieve pressure from the blowout well. In certain instances, such as a crowded oil field, it may be necessary to identify the location of multiple wells to avoid collision incidents. In certain instances, a ranging tool can be used to drill a parallel well to an existing well, for example, in steam assist gravity drainage (SAGD) well structures. In certain instances, a ranging tool can be used to track an underground drilling path using a current injected metallic pipe over the ground as a reference. Traditional electrode sources, for example, for a mandrel, can require insulating gap subs in ranging tool designs to prevent the source and return electrodes from effectively being shorted. It can be difficult to maintain structural integrity and reliability of the ranging tool due to these insulating gap subs.

Additionally, during such ranging operations, as the second well is drilled closer and closer to the first (i.e. target) well, the sensors used on many ranging tools can produce blurry images due to the sensors not having directional sensitivity to provide clear imagery of the target well.

Therefore, it will be readily appreciated that improvements in the arts of determining the position, direction, and orientation of a target well is continually needed.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. Embodiments are described in detail hereinafter with reference to the accompanying figures, in which:

FIG. 4A is a diagram illustrating a cross-sectional view of an example button ranging system using direct excitation of the button, according to one or more embodiments of the present disclosure.

FIG. 4B is a diagram illustrating a front view of an example button ranging system using direct excitation of the button, according to one or more embodiments of the present disclosure.

FIG. 4C is a diagram illustrating a cross-sectional view of an example button ranging system using toroidal excitation of the button, according to one or more embodiments of the present disclosure.

FIG. 4D is a diagram illustrating a front view of an example button ranging system using toroidal excitation of the button, according to one or more embodiments of the present disclosure.

Figure 1:
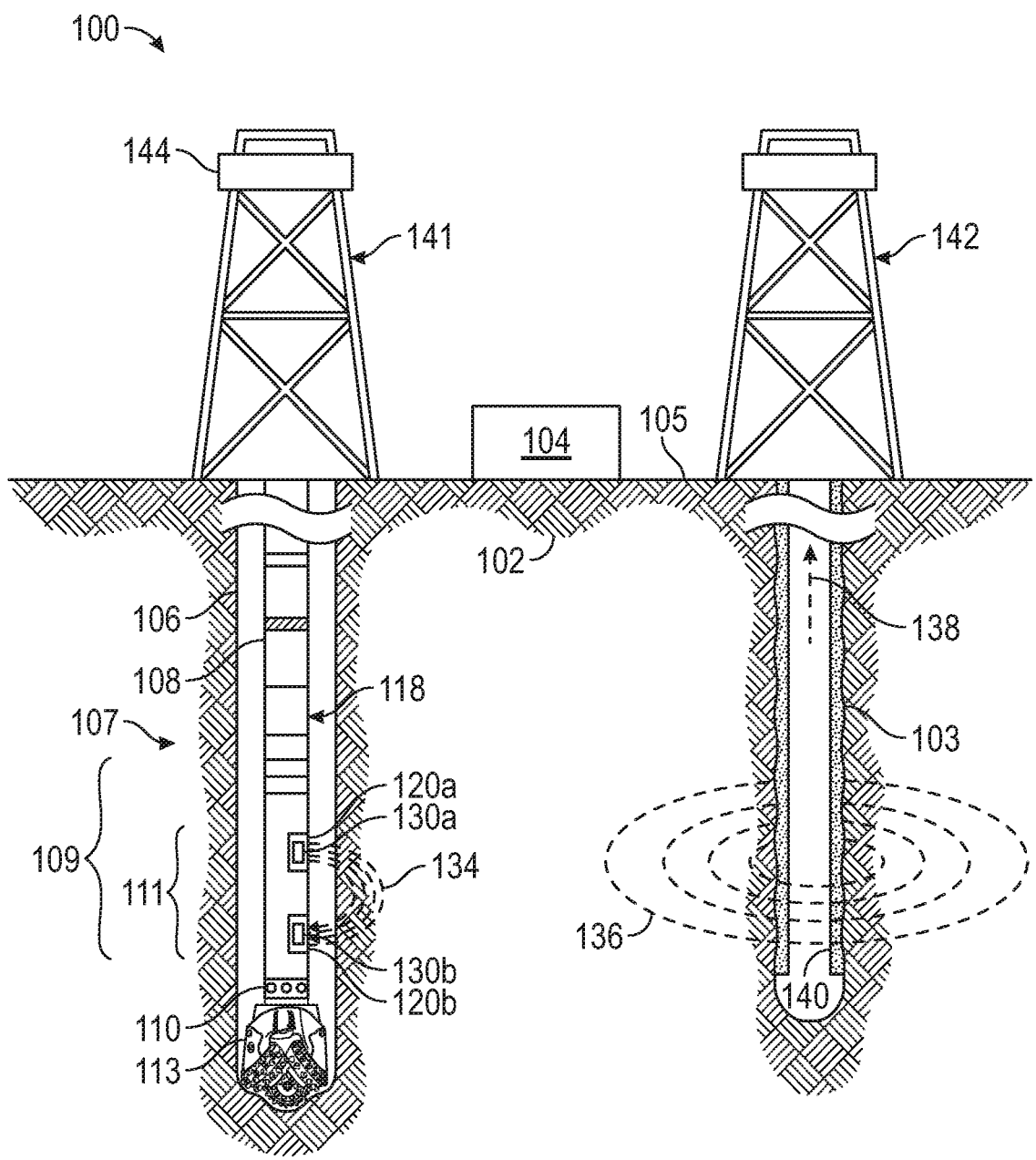
FIG. 1 is a diagram illustrating an example ranging system, according to one or more embodiments of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION OF THE DISCLOSURE

The disclosure may repeat reference numerals and/or letters in the various examples or Figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding figure and the downward direction being toward the bottom of the corresponding figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover, even though a Figure may depict a horizontal wellbore or a vertical wellbore, unless indicated otherwise, it should be understood by those skilled in the art that the apparatus according to the present disclosure is equally well suited for use in wellbores having other orientations including vertical wellbores, slanted wellbores, multilateral wellbores or the like. Likewise, unless otherwise noted, even though a Figure may depict an offshore operation, it should be understood by those skilled in the art that the method and/or system according to the present disclosure is equally well suited for use in onshore operations and vice-versa. Further, unless otherwise noted, even though a Figure may depict a cased hole, it should be understood by those skilled in the art that certain embodiments of the method and/or systems according to the present disclosure are equally well suited for use in open hole operations.

As used herein, the words "comprise," "have," "include," and all grammatical variations thereof are each intended to have an open, non-limiting meaning that does not exclude additional elements, steps, or operations. While compositions and methods are described in terms of "comprising," "containing," or "including" various components, steps, or operations, the compositions and methods also can "consist essentially of" or "consist of" the various components, steps, and operations. It should also be understood that, as used herein, "first," "second," and "third," are assigned arbitrarily and are merely intended to differentiate between two or more objects, etc., as the case may be, and does not indicate any sequence. Furthermore, it is to be understood that the mere use of the word "first" does not require that there be any "second," and the mere use of the word "second" does not require that there be any "first" or "third," etc.

The terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". In the figures and the description, like numerals are intended to represent like elements.

To facilitate a better understanding of the present disclosure, the following examples of certain embodiments are given. In no way should the following examples be read to limit, or define, the scope of the disclosure. Embodiments of the present disclosure may be applicable to drilling operations that include but are not limited to target (such as an adjacent well) following, target intersecting, target locating, well twinning such as in SAGD (steam assist gravity drainage) well structures, drilling relief wells for blowout wells, river crossings, construction tunneling, as well as horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or local area network (LAN). Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Generally, this disclosure provides a system and method for reentry and/or redrilling ranging using focused electrode virtual sets and simulated rotation of the electrode sets. In one example, an array of button electrodes can be circumferentially and longitudinally/axially spaced on a mandrel of a downhole tool, with the selective firing of these buttons creating a virtual rotation of the buttons without the mandrel rotating.

Modern petroleum drilling and production operations demand information relating to parameters and conditions downhole. Several methods exist for downhole information collection, including logging while drilling ("LWD") and measurement-while drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

There exist different approaches for obtaining current on the target object to perform ranging operations and for taking ranging measurements. Ranging tools may be used to determine the position, orientation and direction of a target object that is conductive, for example, the metallic casing of a target object or well. In one approach, an electrode type source is used to induce current on the target object. This current then induces a secondary magnetic field which can be measured by the receivers on the ranging tool. Based on the strength of the magnetic field, location of the target object may be determined, for example. Alternatively, gradient of the magnetic field radiated by the target object in addition to the magnetic field itself may also be measured. By using a relationship between the magnetic field and its gradient, a ranging measurement may be made.

In existing ranging tools that use direct excitation, electrodes are located directly on the mandrel which may alter the integrity or strength of the mandrel. This is an important consideration given the amount of stress on the mandrel during drilling operations, for example, logging while drilling operations. If the electrodes are located on an exterior surface of the mandrel the source and return electrodes would effectively be shorted necessitating the use of insulating gap subs which may also affect electrical connections producing difficulties in design and reduced reliability of the ranging tool. One or more embodiments of the present disclosure position electrodes (e.g., button electrodes) within an isolation layer where the isolation layer is within a groove or recess of a mandrel or downhole tool. The electrodes may be excited via direct excitation or toroidal excitation. The isolation layer ensures that there is no direct coupling from the electrodes to the mandrel which may significantly reduce the currents on the mandrel. These electrodes have partial azimuthal coverage as the buttons may not wrap entirely around the mandrel. Currents are forced to a certain azimuthal direction allowing for directional measurements. Thus, effective mandrel isolation is accomplished, comparable to that of a gap sub, with the benefit that the structural strength and integrity and reliability of the downhole tool are improved.

FIG. 1 is a diagram illustrating an example drilling and ranging system environment 100, according to aspects of the present disclosure. The environment 100 includes rig 144 at the surface 105 and positioned above borehole 106 within a subterranean formation 102. Rig 144 may be coupled to a drilling assembly 107, comprising drill string 108 or coiled tubing (not shown) and bottom hole assembly (BHA) 109. The BHA 109 may comprise a drill bit 113 and a downhole tool 111. The downhole tool 111 may be any type of downhole tool 111 including, but not limited to, a MWD, an LWD, ranging tool, sensors, a galvanic tool, etc. In certain embodiments, the drilling assembly 107 may be rotated by a top drive mechanism (not shown) to rotate the drill bit 113 and extend the borehole 106. In certain embodiments the BHA may be equipped with stabilizers (not shown) to mechanically stabilize the BHA in the borehole in order to avoid unintentional sidetracking and vibrations. In certain other embodiments, a downhole motor (not shown), such as a mud motor, may be included to rotate the drill bit 113 and extend the borehole 106 without rotating the drilling assembly 107. In other embodiments, such as in an offshore drilling operation, the surface 105 may be separated from the rig 144 by a volume of water.

As used herein, a galvanic tool may comprise any tool with electrodes through which current is injected into a subterranean formation and a voltage response of the formation to the injected current is measured. As the bit extends the borehole 106 through the formation 102, the downhole tool 111 may collect resistivity measurements relating to borehole 106, the borehole 103 and the formation 102. In certain embodiments, the orientation and position of the downhole tool 111 may be tracked using, for example, an azimuthal orientation indicator, which may include magnetometers, inclinometers, and/or accelerometers, though other sensor types such as gyroscopes may be used in some embodiments. The downhole tool 111 can also collect measurements while the drill bit is not rotating. In this configuration, the downhole tool 111 can provide a virtual rotation of the downhole tool 111 by selectively energizing electrodes to simulate rotation of the downhole tool 111. Simulating a rotation of the electrodes may require an array of 2 or more electrodes positioned on the downhole tool 111.

Ranging operations may require that a location of a target object, for example, a conductive target, be identified. In the embodiment shown, the target object comprises a target well 142 for a second borehole 103. The borehole 103 may comprise a casing 140 containing or composed of an electrically conductive member such as casing, liner or a drill string or any portion thereof that needs to be intersected, followed, tracked or avoided. In the embodiment shown, the borehole 103 includes an electrically conductive casing 140. Identifying the location of the target well 142, with respect to the drilling well 141, with conductive casing 140 may comprise taking various measurements and determining a direction of the target well 142 and borehole 103 relative to the borehole 106. These measurements may comprise measurements of electromagnetic fields in the formation using the buttons 130. Magnetic field measurements may identify the distance, orientation and direction to the target well 142.

In certain embodiments, performing ranging measurements may include inducing an electromagnetic (EM) field within the second borehole 103. In the embodiment shown, inducing a magnetic field within the borehole comprises injecting a formation current 134 into the formation 102 by exciting a source button 130a and returning at return button 130b where the buttons 130 are isolated from the BHA 109 or downhole tool 111 by an isolation layer 120. Part of the induced formation current 134 may be received and concentrated at the casing 140 within the target well 142, shown as current 138, and the current 138 on the casing 140 may induce a magnetic field 136 in an azimuthal direction from the direction of the flow of the electric current 138. Formation current 134 may be induced within the formation 102 by energizing the source button 130a of the drilling assembly 107 according to a control signal that specifies signal characteristics for the formation current 134. The formation current 134 may comprise, for example, an alternating current electrical signal. The source button electrode 130a may be insulated from the BHA 109 and excited directly, or electrically connected to or a part of the BHA and excited electromagnetically with a toroidal winding. Part of the induced formation current 134 may be received and concentrated at the casing 140 within the target well 142, shown as current 138, and the current 138 on the casing 140 may induce a magnetic field 136 in an azimuthal direction with respect to the direction of the flow of the electric current 138. A magnetic field 136 created by the target object or target well 142 may be proportional to the current flowing into the formation.

In particular, the drilling assembly 107 includes grooves or recesses which allow for installation of isolation layers 120. Electrode buttons 130 may be buttons which are installed within the isolation layers 120 and excited directly (direct excitation). While buttons 130 are shown as being excited using direct excitation, in other embodiments, electrode buttons 130 may be electrically connected to or a part of the BHA 109 and excited electromagnetically with a toroidal winding (toroidal excitation). The direct excitation may work at lower frequencies compared to the toroidal excitation, however toroidal excitation provides higher structural integrity as total isolation from the mandrel is not required. Isolation layers 120 may aid current to flow into the formation 102. The isolation layers 120 and electrode buttons 130 may be installed within any one or more portions of the downhole tool 111. The isolation layers 120 and electrode buttons 130 are installed such that no cut that slices the mandrel, downhole tool 111, BHA 109, etc. need be made as the isolation layers 120 and buttons 130 are installed within a groove or recess. In any embodiment, the isolation layers 120 and buttons 130 may be located at a top portion of the downhole tool 111 and/or a bottom portion of the downhole tool 111 and/or any location in between. In other embodiments, the isolation layers 120 and buttons 130 may be located within any downhole tool, mandrel, LWD, MWD, BHA 109, or any other component or element of drill string 108 such as, for example, stabilizers. Buttons 130 may comprise a source button 130a located at an isolation layer 120a and a return button 130b located at an isolation layer 120b. The isolation layers 120 electrically isolate the buttons 130 from the downhole tool 111.

The source button 130a may comprise an antenna and the formation current 134 may comprise a time-varying electromagnetic field that is emitted from the source button 130a. The receivers 110 may comprise but are not limited to an induction type sensor, a Hall Effect magnetometer sensor, a magnetic gradiometer or a combination or pair of any of the magnetometers listed above or any other type of sensor or combination of sensors known to one of ordinary skill in the art. Likewise, the receivers 110 may be uniaxial, biaxial, or triaxial, and also may be a flux-gate, solenoid, or coil type sensor. In certain embodiments, an isolation layer 120 and corresponding installed button 130 may be positioned at various locations along the BHA 109, or above the BHA 109, such as between the drill string 108 and the BHA 109. The orientation of the buttons 130 may be reversed, for example, the source button 130a may be located closer to the drill bit 113 or closer to the surface 105 in relation to the return button 130b. It may be advantageous to position the buttons 130 as close to the bottom of the borehole 106 as possible. It may be advantageous to locate the source button 130a and return button 130b as far apart as possible or to locate the source button 130a and return button 130b within a predefined range. Similarly, receivers 110 may be located at any suitable location along or at any component of drill string 108. Additional source buttons 130*a* can be positioned at varying distances from the button 130*b*, thereby varying the depth of penetration of the injected currents 134 into the formation 102. There can also be additional return buttons 130*b* to increase the flexibility of the downhole tool 111 to interrogate the formation 102 for target wells. The additional source buttons 103*a* and return buttons 130*b* can be circumferentially spaced apart around a body of the downhole tool 111 as well as longitudinally/axially spaced apart along the axis of downhole tool 111, which can form a circular grid of buttons 130 in the downhole tool 111.

In certain illustrative embodiments, a hole in the isolation layers 120 and the downhole tool 111, or any other part of the BHA 109 or drilling assembly 107, may be utilized to permit a wire (not shown) to couple to the source buttons 130*a* to excite (for example, direct the formation current 134) the source buttons 130*a*. In any embodiment, the source button 130*a* may be located on the order of 10-200 feet from the return button 130*b* or at any range greater, lesser or in between.

In certain embodiments, performing ranging measurements may include inducing an electromagnetic (EM) field within the second borehole 103 based, at least in part, on a formation current 134 injected into the formation 102. In the embodiment shown, inducing an electromagnetic field within the borehole 103 comprises injecting a formation current 134 by exciting a source button 130*a* to induce current to flow into the formation and return at return button 130*b*. The source of the excitation may be a voltage or a current. Buttons 130 may be components of the downhole tool 111, BHA 109, or any other downhole component. Formation current 134 may be induced within the formation 102 by energizing the source button 130*a* of the drilling assembly 107 according to a control signal that specifies signal characteristics for the formation current 134. The formation current 134 may comprise, for example, an alternating current electrical signal. Part of the formation current 134 may be received and concentrated at the casing 140 within the conductive target (target well 142), shown as current 138, and the current 138 on the casing 140 may induce a magnetic field 136 in an azimuthal direction with respect to the direction of the flow of the electric current 138. A magnetic field 136 created by the conductive target or casing 140 may be proportional to the current flowing into the formation 102; strength of this magnetic field 136 decreases as the radial distance from the conductive target or casing 140 increases.

In certain embodiments, a system control unit 104 may be positioned at the surface 105 as depicted in FIG. 1 and may be communicably or communicatively coupled to downhole elements including, but not limited to, drilling assembly 107, telemetry system 118, downhole tool 111, and BHA 109. In other embodiments, a system control unit 104 may be positioned below the surface 105 (not shown) and may communicate data to another system control unit 104 or any other system capable of receiving data from the system control unit 104. For example, the control unit 104 may be communicably coupled to the downhole tool 111, electrodes 130, drill bit 113, or any other component through a telemetry system 118. The telemetry system 118 may be incorporated into the BHA 109 or any other downhole component of drilling assembly 107 and may comprise a mud pulse type telemetry system that transmits information between the surface system control unit 104 and downhole elements via pressure pulses in drilling mud. Although the system control unit 104 is positioned at the surface 105 in FIG. 1, certain processing, memory, and control elements may be positioned within the drilling assembly 107. Additionally, various other communication schemes may be used to transmit communications to/from the system control unit 104, including wireline configurations and wireless configurations.

In certain embodiments, the system control unit 104 may comprise an information handling system with at least one processor and a memory device communicably coupled to the processor that contains a set of instructions that when executed cause the processor to perform certain actions. In any embodiment, the information handling system may include a non-transitory computer readable medium that stores one or more instructions where the one or more instructions when executed cause the processor to perform certain actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

The formation current 134 may be injected into the formation 102 by excitation of the source button 130*a*. In certain embodiments, the system control unit 104 may excite the source button 130*a* by sending a command downhole to the downhole tool 111 or a controller associated with the downhole tool 111. The command(s) may cause the downhole tool 111 to excite the source button 130*a*. In other embodiments, the source button 130*a* is excited by a downhole source located at or associated with the downhole tool 111. In one or more embodiments the source of excitation may be located downhole or at the surface 105.

In certain embodiments, the signal characteristics of the formation current 134 may be based at least in part on at least one downhole characteristic within the borehole 106 and formation 102, including a noise level within the formation 102; a frequency transfer function of the source button 130*a*, the return button 130*b*, and the formation 102; and a frequency response of the target object. The noise level within the formation 102 may be measured downhole using electromagnetic or acoustic receivers coupled to the drilling assembly, for example. The frequency transfer function and the frequency response of the target borehole 103 may be determined based on various mathematical models or may be extrapolated from previous ranging measurements. In certain embodiments, the anticipated signal characteristic of the formation current 134 can be determined prior to operation by using preexisting formation 102 surveys and evaluations from previous drilling jobs. In certain embodiments, the anticipated signal characteristic of the formation current 134 can be determined by simulating the signal response using physics-based models. In certain embodiments, the system control unit 104 may further send commands to any one or more of receivers 110 to cause any one or more of the receivers 110 to measure the induced magnetic field 136 on the second borehole 103. These receivers 110 can be circumferentially spaced at equal-distances around the downhole tool 111. It is preferred to have a set of receivers 110 proximate the drill bit 113. However, it can also be beneficial to have another set of receivers 110 positioned above the downhole tool 111 away from the drill bit 113. The relative positioning of the two separate receiver 110 sets relative to the conductive casing 140 of the target well can provide additional information for steering the drill string 108 relative to the conductive casing 140. Like the source button 130a, the receivers 110 may be coupled to a downhole controller, and the commands from the system control unit 104 may control, for example, when the measurements are taken. In certain embodiments, the system control unit 104 may determine and set a sampling rate of the induced magnetic field 136, as will be described below. Additionally, measurements taken by the one or more receivers 110 may be transmitted to the system control unit 104 via the telemetry system 118. The control unit 104 may determine a distance, orientation and direction to the conductive target (for example, target well 142 or casing 140 of borehole 103) in the embodiment shown, based at least in part on the measurement of the induced magnetic field 136. For example, the system control unit 104 may use geometric algorithms to determine the distance, orientation and direction of the second borehole 103 relative to the borehole 106. Geometric algorithms refer to any algorithm used to describe computational geometry used to solve various geometric problems such as distance and direction between two or more points, as would be readily understood by those ordinarily skilled in the art having the benefit of this disclosure.

Figure 2:
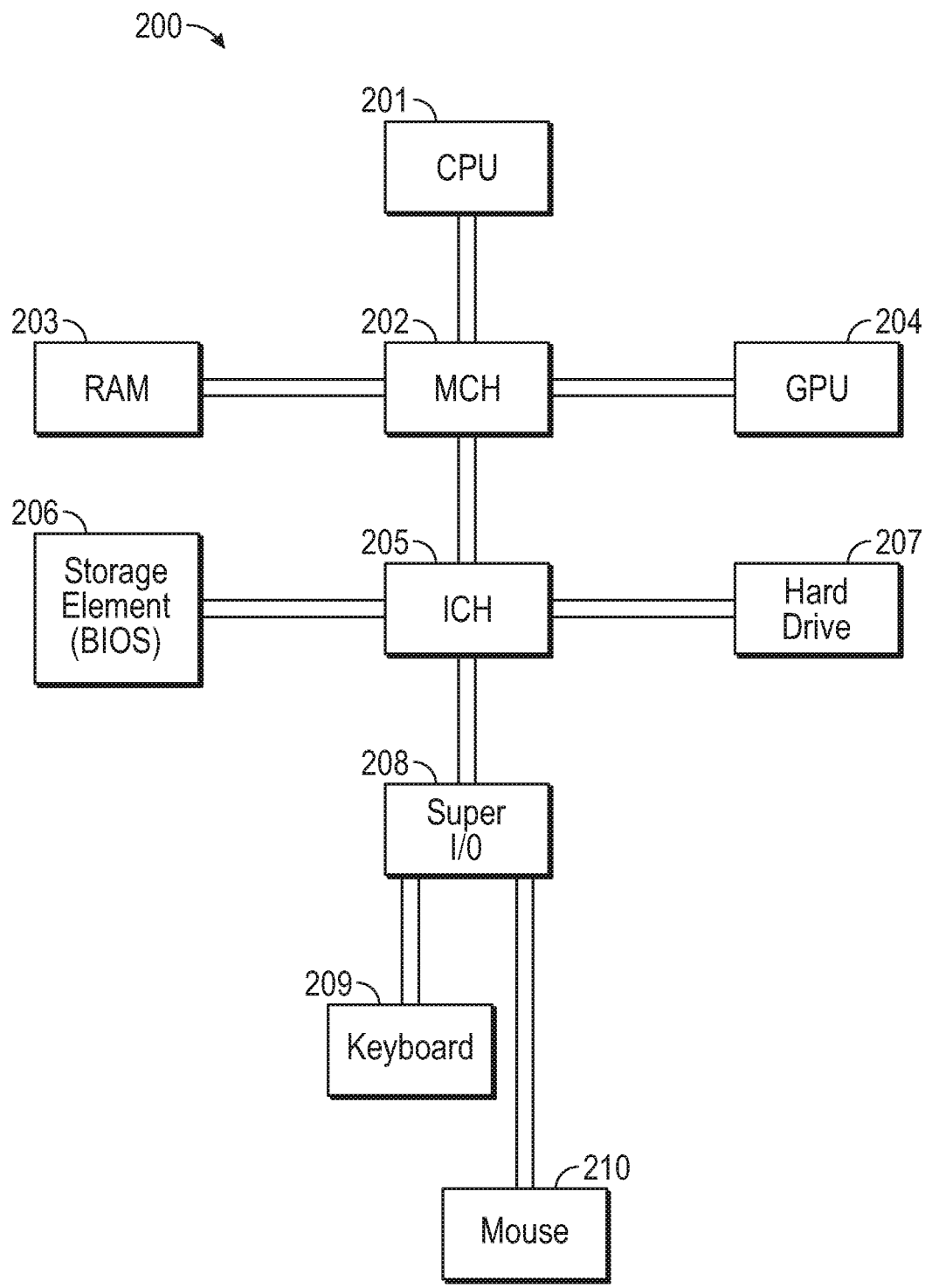
FIG. 2 is a diagram illustrating an example information handling system, according to one or more embodiments of the present disclosure.

FIG. 2 is a diagram illustrating an example information handling system 200, according to aspects of the present disclosure. The system control unit 104 may take a form similar to the information handling system 200. A processor or central processing unit (CPU) 201 of the information handling system 200 is communicatively coupled to a memory controller hub or north bridge 202. The processor 201 may include, for example a microprocessor, microcontroller, digital signal processor (DSP), application specific integrated circuit (ASIC), or any other digital or analog circuitry configured to interpret and/or execute program instructions and/or process data. Processor 201 may be configured to interpret and/or execute program instructions or other data retrieved and stored in any memory such as memory 203 or hard drive 207. Program instructions or other data may constitute portions of a software or application for carrying out one or more methods described herein. Memory 203 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software or application may be retrieved and stored in memory 203 for execution by processor 201.

Modifications, additions, or omissions may be made to FIG. 2 without departing from the scope of the present disclosure. For example, FIG. 2 shows a particular configuration of components of information handling system 200. However, any suitable configurations of components may be used. For example, components of information handling system 200 may be implemented either as physical or logical components. Furthermore, in some embodiments, functionality associated with components of information handling system 200 may be implemented in special purpose circuits or components. In other embodiments, functionality associated with components of information handling system 200 may be implemented in configurable general purpose circuit or components. For example, components of information handling system 200 may be implemented by configured computer program instructions.

Memory controller hub 202 may include a memory controller for directing information to or from various system memory components within the information handling system 200, such as memory 203, storage element 206, and hard drive 207. The memory controller hub 202 may be coupled to memory 203 and a graphics processing unit 204. Memory controller hub 202 may also be coupled to an I/O controller hub or south bridge 205. I/O hub 205 is coupled to storage elements of the information handling system 200, including a storage element 206, which may comprise a flash ROM that includes a basic input/output system (BIOS) of the computer system. I/O hub 205 is also coupled to the hard drive 207 of the information handling system 200. I/O hub 205 may also be coupled to a Super I/O chip 208, which is itself coupled to several of the I/O ports of the computer system, including keyboard 209 and mouse 210.

In certain embodiments, determining the distance and direction of the second borehole 103 relative to the first borehole 106 may be accomplished using the magnetic fields received by any one or more of the receivers 110. In certain embodiments, the distance and direction determination may be achieved utilizing the relationship in Equation (1) between the pipe current and the received magnetic fields.

$$\overline{H} = \frac{I}{2\pi r}\hat{\phi} \qquad \text{Equation (1)}$$

where H is the magnetic field vector, I is the current on the pipe 140, r is the shortest distance between the return electrode 130b and the casing 140; and ϕ̂ is a vector that is perpendicular to both the z-axis of the receiver 110 and the shortest vector that connects the casing 140 to the return electrode 130b. Although Equation (1) assumes constant casing current along the casing, it can be extended to any current distribution by using the appropriate model.

In certain embodiments, the distance and direction of the second borehole 103 relative to the first borehole 106 may be determined using Equations (2) and (3), respectively.

$$r = \frac{I}{2\pi|\overline{H}|} \qquad \text{Equation (2)}$$

$$\Phi = \text{angle}(\hat{x}\cdot\overline{H}, \hat{y}\cdot\overline{H}) + 90 \qquad \text{Equation (3)}$$

where "·" is the vector inner-product operation, and x̂ and ŷ are unit vectors orthogonal to a symmetry axis of the tool 111. In certain instances, however, Equation (2) may be unreliable if a direct or accurate measurement of I is not possible.

When a direct or accurate measurement of I is difficult or impossible, magnetic field gradient measurement may be utilized for the direction and distance determinations. Spatial change in the magnetic field may be measured in a direction that has a substantial component in the radial (r-axis) direction as in Equation (4).

$$\frac{\partial \overline{H}}{\partial r} = -\frac{I}{2\pi r^2}\hat{\phi}$$

Equation (4)

where ∂ is the partial derivative. With this gradient measurement available in addition to an absolute measurement, the distance to the second borehole 103 may be calculated using Equation (5).

$$r = \frac{|\overline{H}|}{\left|\frac{\partial \overline{H}}{\partial r}\right|}$$

Equation (5)

In certain embodiments, the gradient field in Equation (5) may be realized in practice by utilizing finite difference of two magnetic field dipole measurements as shown below in Equation (6):

$$r = \frac{H_y}{\frac{H_y\left(x+\frac{\Delta x}{2}, y\right) - H_y\left(x-\frac{\Delta x}{2}, y\right)}{\Delta x}}$$

Figure 3A:
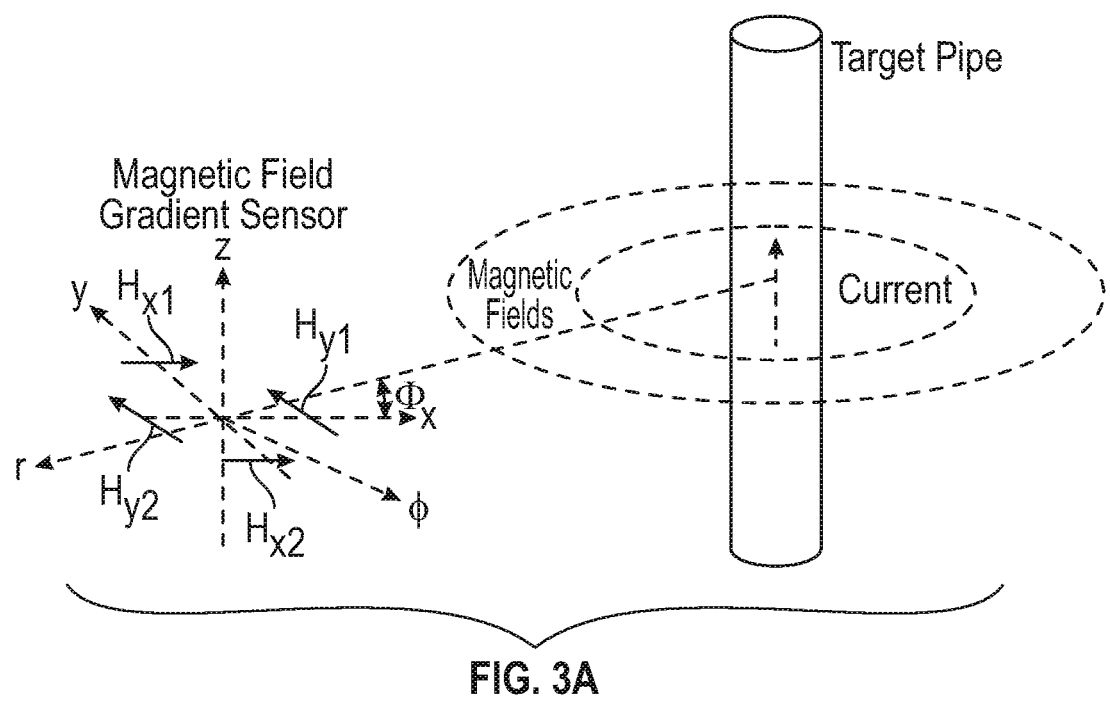
FIG. 3A is a diagram illustrating example gradient measurement components in relation to a target object and the magnetic fields produced by currents on the pipe, according to one or more embodiments of the present disclosure.

Equation (6)

where $H_y$ and the gradient measurement components are illustrated in the 4-dipole configuration of FIG. 3A in relation to a target casing 140 and the magnetic fields produced by currents on the casing 140.

Figure 3B:
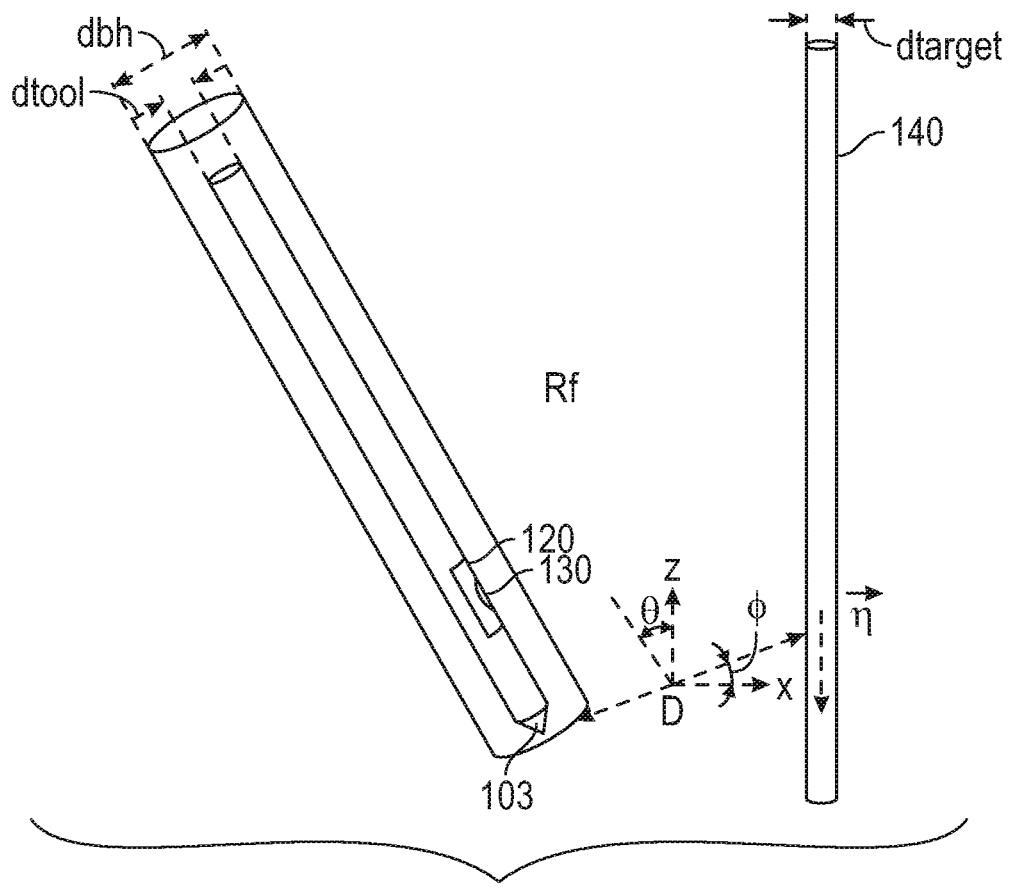
FIG. 3B is a diagram illustrating example ranging geometry, according to one or more embodiments of the present disclosure.

Directionality of the buttons 130 proposed in the present disclosure may increase the accuracy of the downhole tool, for example, the accuracy of a ranging tool. The ranging geometry according to aspects of the present disclosure is illustrated in FIG. 3B. Although no return electrode 130b is shown, it may be assumed that the button 130 is a source button 130a or a button 130 excited via toroidal excitation. FIG. 3B illustrates a ranging tool as the downhole tool 111 (FIG. 1) mounted on a LWD drilling assembly 107 (FIG. 1). A reference point on the target object (for example, casing 140) is at a distance D away from a reference point on the drilling assembly 107, which is illustrated in FIG. 3B as the tip of the drill bit 103. The inclination of the target object and the azimuth of the target object with respect to the downhole tool 111 are shown as θ and Φ, respectively. The direction of a unit vector parallel to the axis of the target object at the reference point is illustrated as η in FIG. 3B. A ranging tool should determine all four parameters to correctly identify the ranging parameters, for example, direction, distance and orientation of a target object. An inversion algorithm may be used to aid in determining these ranging parameters. Other parameters may also require inversion, for example, Rm and diameter dbh, while the formation 102 is assumed to be homogeneous with a resistivity of Rf. These parameters may be determined with the assistance of other tools, such as a caliper sensor for dbh, a mud sensor for Rm and a resistivity tool that operates in tandem with the ranging tool having an Rf.

Directional information may be used in detecting the presence of a target object. When the target object is far away, the transmitted field patterns of the buttons 130 behave in a more nondirectional manner. Thus, it may not be possible to detect the presence of a target object by just looking at the variation of the received signal (the signal received after exciting the buttons 130) with azimuth. However, there may still be some sensitivity to direction which may aid the detection of the presence of the target object earlier than a traditional design.

A forward model, for example, a ranging model, of a downhole tool 111, borehole 106 and environment may be used to predict the measured signal (for example, magnetic field 136) at receivers 110 assuming no target object (or a target object at infinite distance). The modeled signal (or predicted signal) may be denoted as $\overline{M}^\infty$. The actual measured signal, $\overline{S}^\infty$, is subtracted from the modeled signal $\overline{M}^\infty$. For example, the magnitude of the measured signal $\overline{S}$ may be subtracted from the magnitude of the modeled signal $\overline{M}^\infty$. In one or more embodiments, the magnitude of one or more signals associated with the excitation of one or more buttons 130 is compared to the modeled signal $\overline{M}^\infty$. The norm of the error is compared with a threshold that is based on the downhole tool 111 and the environmental parameters. If a difference is larger than the threshold it may be concluded that a target object is present. When a target object is present, inversion may be used to determine the direction, distance and orientation of the target object with respect to the drilling well 141. As used herein "Inversion" refers to a process of selecting values for unknown parameters in a simulation in order to produce an output that closely approximates measurements provided by actual sensors and/or measurement estimations based on additional simulators and/or previously collected data. In one or more embodiments, a drilling parameter is adjusted based, at least in part, on the determination of whether a target object is present. Inversion also uses a forward model of the downhole tool 111 for this purpose and tries to find the downhole tool 111, environment and the target object properties that would minimize a cost function. The cost function may include the error (for example, in the Euclidean norm sense) between the measured signal and the signal that is predicted by the forward model for a specific set of properties as well. However, additional regularization terms may be added to the cost function to increase its accuracy or to make it behave more smoothly.

Directional information may also be used to help inversion. In particular, directional information may be used to constrain the azimuthal position (Φ) of the target object. This may be done by comparing the signal levels of different buttons 130 and by creating a regularization function R where a weight $w_i$ is assigned that is proportional to the magnitude of the received signal corresponding to each button 130. The value of the regularization function R is reduced if inverted Φ is closer to the direction of a button i ($\Phi_{bi}$) with a higher signal, where the total number of buttons is assumed to be N as illustrated by Equation (7).

$$R = \Sigma_{i=1}^{N} w_i \|\Phi - \Phi bi\|$$

Equation (7)

This regularization term may then be added to the cost function of the inversion. If the target object is not close to the downhole tool 111, buttons 130 may not have a large azimuthal sensitivity. A regularization function R would have little effect on the inversion when the target object is far away as the signal level and the signal variation between signals due to different buttons 130 would be low. It may be desirable not to use the constraint on direction in inversion in such cases. In one or more embodiments, a drilling parameter is adjusted based, at least in part, on the cost value.

In one embodiment, an assessment of the presence of the target object may be made based on the level of the measured signals. If a target object is deemed to be not present based, at least in part, on one or more criteria, measurements may continue. If a target object is present based, at least in part, on one or more criteria, distance of the target may be estimated. If the target object is not close enough, directional information may not be used to estimate the distance to the target object. When the target object is close enough, a regularization term may be added to the inversion. When a target object is not close by, buttons 130 do not have a large azimuthal sensitivity. As the target object gets closer, field pattern of the buttons 130 become more directional and coupling with the conductive casing 140 (the target object) becomes more important than the formation current 134, especially for buttons facing the target object.

Further, power consumption may be a big concern for a downhole tool such as downhole tool 111. There is a limit on the amount of power that can be transmitted via a power cable which may then be shared with any number of tools of the drilling assembly 107. In some operations, power may be obtained from a battery downhole. Power transmitted in all azimuthal directions while the target object is in a particular azimuthal direction is a waste of power resources. Instead, directional excitation may be implemented where a higher power may be transmitted to the button(s) 130 that are facing the target object which creates a higher signal originating from the target object at the receivers 110. Directional excitation of the buttons 130 eliminates unnecessary noise coming from the buttons 130 not facing the target object.

Selection of the buttons 130 to excite may be based, at least in part, on the volume of sensitivity of each button 130. The volume of sensitivity may be stored in a memory in one or more formats such as a table, an array, an index, a database, a flat file, or any other format or storage known to one of ordinary skill in the art. The volume of sensitivity may be dependent on formation 102 and mud properties and may be based, at least in part, on the ranging parameters associated with the target object obtained from an inversion at a previous logging point. A button(s) 130 that is determined to be sensitive to the target object based, at least in part, on the volume of sensitivity, may be selected and only the button 130 or buttons 130 selected may be excited. Power to the selected button(s) 130 may be increased correspondingly based on how many buttons 130 are excited. In one or more embodiments, a non-azimuthal operation of the downhole tool 111 is maintained when a determined distance to the target object is larger than a sensitivity threshold where the threshold may be based, at least in part, on a volume of sensitivity associated with at least one button 130. In other embodiments, a button 130 may only be excited when the button 130 has an associated volume of sensitivity greater than a sensitivity threshold.

FIG. 4A, FIG. 4B, FIG. 4C and FIG. 4D are diagrams illustrating an example button excitation system 400a, 400b, 400c and 400d, respectively, according to one or more embodiments of the present disclosure. FIGS. 4A and 4C are cross-sectional views while FIGS. 4B and 4C are front views. FIGS. 4A and 4B are example button ranging systems using direct excitation of the button according to one or more aspects of the present disclosure. FIGS. 4C and 4D are example button ranging systems using toroidal excitation of the button according to one or more aspects of the present disclosure. Generally, mandrels or downhole tools 111 are made of metals which can withstand torque from twisting and rotational forces as well as forces due to the weight of the drilling assembly 107 itself.

Figure 5A:
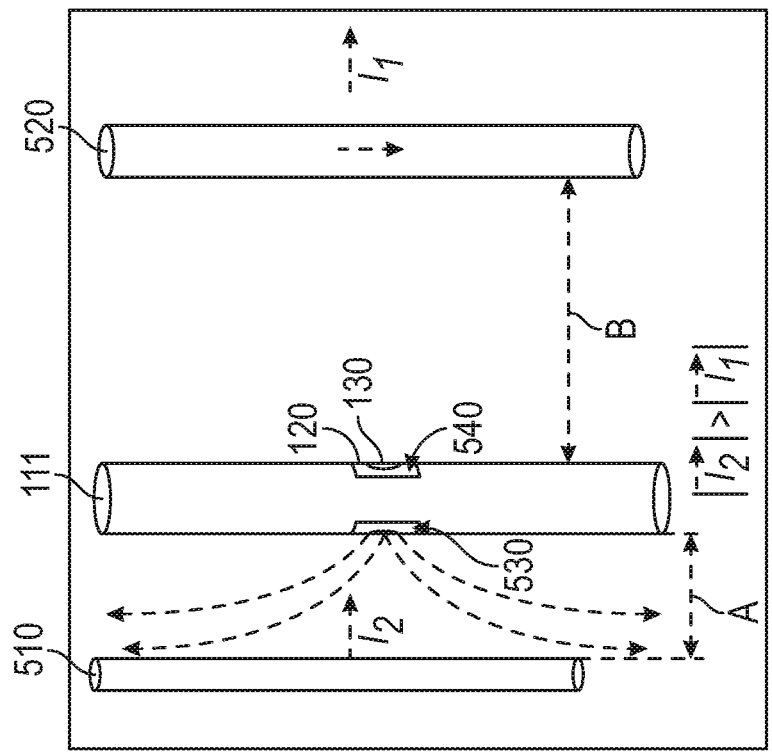
FIG. 5A and FIG. 5B are diagrams illustrating excitation of a button for determining presence of a target object, according to one or more embodiments of the present disclosure.
Figure 5B:
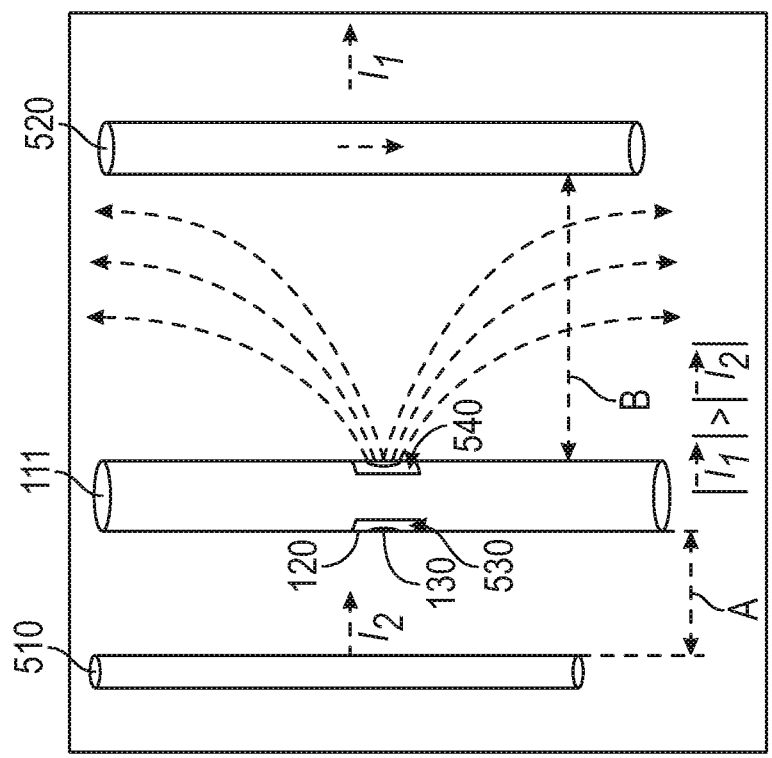

As illustrated in FIGS. 5A and 5B, multiple target objects (for example, 510 and 520) may be within a proximity to a downhole tool 111. In one or more embodiments, multiple target objects 510 and 520 (for example, multiple casings 140 associated with multiple target wells 142) may be within a ranging proximity to the downhole tool 111. For example, in crowded drilling fields or in SAGD type applications, multiple target objects may be in close proximity to each other. Directional excitation of buttons 130 may be utilized to distinguish the multiple target objects. For a multiple target object environment, a downhole tool 111 with multiple buttons located at different axial locations may provide the required angular resolution to determine one or more ranging parameters for the multiple target objects.

As illustrated in FIG. 5A, in one illustrative embodiment, a button 540 is located at first location on the downhole tool 111 and a button 530 is located at second location on the downhole tool 111. A target object 520 may be located at a distance B from the button 540 and a target object 510 may be located at a distance A from button 530. When the button 540 is excited in this example, the target object 520 will have a current with the greatest amplitude. As illustrated in FIG. 5B, in another embodiment, a button 530 may be excited. The target object 510 will have a current with a greater amplitude than the target object 520. The receivers 110 will receive different signals and these different signals may be used to determine the position of the multiple target objects. For example, the receivers may receive a stronger signal from target object 510 from excitation of button 530 than from target object 520 from excitation of button 540. The presence of multiple target objects may be incorporated in the forward model of an inversion. The directional sensitivity of each button 130 will automatically cause the inversion to perform better for a multiple target object environment. Approximate angular position may also be used to constrain the angular positions of the target objects or may be used without any inversion. The inversion may then return one or more ranging parameters associated with each of the target objects.

With references back to FIGS. 4A-4D, although slight variations may exist between different ranging tools that utilize direct excitation, generally such operate in a similar manner. An electrode is excited with a current or voltage source which causes the current to be emitted from a source electrode (for example, source button 130a) into the formation 102 through the mud. In general, and especially for logging-while-drilling tools, the drill string 108 or the mandrel of the downhole tool 111 (or ranging tool) is preferred to be metallic. A metallic downhole tool 111 increases the structural strength of the drill string 108, enables it to better resist the considerable stress caused by the weight of the drill string 108 and its torque and reduces mechanical failures. However, a metallic structure is electrically highly conductive. Since electrical current prefers to flow in the path of least resistance, the metallic structure itself as opposed to the formation 102 provides a more attractive path to a return button 130b. Thus, current emitted into the formation 102 is reduced by the amount of current that is emitted through the metallic structure. To prevent current from flowing through the metallic structure and to force current into the formation 102, insulating gap subs may be inserted in downhole tool 111. Although these gap subs prevent current flow along the metallic structure (for example, along BHA 109 or downhole tool 111), current may short to downhole tool 111 through the mud around the gap sub. Though some current is lost, a significant portion of the current may flow to the formation 102 compared to a configuration without the gap sub.

However, to insert a gap sub, it is necessary to physically separate the downhole tool 111 into multiple pieces and add an insulating material between these separated pieces. The resulting ranging tool or system has a weaker structural strength than a single piece tool without gap subs and may be more prone to mechanical failures. Also, in general, a variety of cables (for example, cables for telemetry and power transfer) run inside the tool and must pass through each gap sub. Accommodating the passage of these cables through each gap sub may present a design challenge as these cables must be fitted inside the gap sub. A higher incidence of failures of the tool or system may arise due to failure of the cables or interconnects that are on or around the gap subs. Difficulties may also be experienced, for example, in the production of a feasible deep ranging tool due to reduced performance or reliability issues.

A ranging tool according present disclosure that includes a button excitation system of any of 400a, 400b, 400c and 400d as illustrated in FIG. 4A, FIG. 4B, FIG. 4C, and FIG. 4D, respectively, is well adapted to attain the ends and advantages of a more reliable, more structurally stable and easier to manufacture ranging tool or downhole tool 111 and system. Directional excitation of the buttons 130 or toroidal excitation of a button 130 may allow the orientation of a target object to be determined more accurately in ranging measurements. In one or more embodiments, once a target object is detected, only those buttons 130 facing the target object may be excited. Such directional excitation may optimize the power consumption of the downhole tool 111. Directional excitation may also aid in the detection of multiple target objects and to aid in distinguishing the multiple target objects. One or more embodiments may be utilized in LWD, MWD and wireline applications.

FIG. 4A, FIG. 4B, FIG. 4C and FIG. 4D each include buttons 130, isolation layers 120 and downhole tool 111. Isolation layer 120 comprises an insulation installed within a groove or recess of the downhole tool 111 with the button 130 installed within the isolation layer 120 such that the button 130 has no electrical contact to the downhole tool 111. In one or more embodiments, the isolation layers 120 and the buttons 130 are installed such that the top surfaces of the isolation layers 120 and the buttons 130 do not exceed the outer surface of the downhole tool 111. In other embodiments, the top surface of one or more of the isolation layers 120 and the buttons 130 may exceed the outer surface of the downhole tool 111 but such a design may experience greater wear and damage. In other embodiments, the BHA is equipped with one or more stabilizers and the isolation layers 120 and the button electrodes 130 are installed in the stabilizer blades. In FIGS. 4A and 4B, the buttons 130 include a source button 130a and a return button 130b. As electrodes are essentially electric monopoles, electrodes need to have a return where the fields emanating from the source should be terminated. The source and return buttons in FIGS. 4A and 4B are buttons 130 located within an isolation layers 120 which are together located within a groove or recess of the mandrel or the downhole tool 111. Isolation layers 120 electrically isolate the buttons 130 and the metallic mandrel or downhole tool 111. The isolation layers 120 may completely fill the grooves or recesses or only a portion thereof.

In certain embodiments the number of source buttons 130a and the number of return buttons 130b are not the same. Isolation layers 120 provide effective isolation, comparable to that of a gap sub, to prevent direct coupling from buttons 130 to the downhole tool 111. As a result, the amount of current flowing through the mandrel or downhole tool 111 is reduced while the amount of current reaching the target object is increased. The designs illustrated in FIG. 4A, FIG. 4B, FIG. 4C and FIG. 4D may improve the structural strength or integrity and reliability of a direct excitation system 400 by eliminating the need for gap subs.

In FIGS. 4C and 4D, buttons 130 comprise buttons that are excited using toroidal excitation. The buttons 130 excited using toroidal excitation are in essence electric dipoles and may not require a return, but a return can be beneficial when using toroidal excitation. Isolation layers 120 may be present around the entire button 130 excited using toroidal excitation or only the cables carrying current but total isolation from the downhole tool 111 is not necessary. The gain of the button 130 excited using toroidal excitation is proportional to the square of the frequency. Thus, the buttons 130 excited using toroidal excitation have very low gains at low frequencies which require operation of the buttons 130 excited using toroidal excitation at higher frequencies for the buttons 130 excited using toroidal excitation to be effective. Consideration of the attenuation of the electromagnetic fields in the formation 102 with the increase in frequency is required in designing a button 130 excited using toroidal excitation configuration. In certain embodiments, a previous formation survey and/or evaluation or pre-job mathematical physics model of formation 102 could be used to determine the electromagnetic field attenuation effects anticipated in formation 102 and these anticipated effects can be utilized when designing a button 130 to be excited using a toroidal excitation configuration.

The isolation layers 120 may have insulating properties that prevent contact between the downhole tool 111 and the buttons 130. The insulation provided by the isolation layer 120 prevents current from flowing through downhole tool 111 when the source button 130a or the button 130 excited using toroidal excitation is excited resulting in more current flowing into the formation 102. The isolation layer 120 may be of any thickness as required by the specific criteria for a given environment 100 or a given downhole tool 111. Each isolation layer 120 and button 130 may include an opening (for example, a hole or aperture) (not shown) to permit any cables to be fed from the downhole tool 111 through the isolation layer 120 to the button 130. For example, a source cable may be fed to the source button 130a or the button 130 excited using toroidal excitation from the downhole tool 111 through the isolation layer 120 via the opening so as to excite the source button 130a or the button 130 excited using toroidal excitation. The opening may be only as big as necessary to allow for the cabling. While one of ordinary skill in the art will recognize that the smaller the opening the greater the structural integrity of the downhole tool 111, the present disclosure contemplates any size opening as necessary for any embodiment. The buttons 130 may be installed within or affixed in any manner known to one of ordinary skill in the art, or any combination thereof.

As illustrated in FIGS. 4A through 4D, multiple buttons 130 may be placed along the same axial location. In other embodiments, multiple buttons 130 may be placed at different axial locations. In other embodiments, only one button 130 may be installed. The placement of the buttons 130 may depend on the goals of each distinct operation. The source button 130a and the return button 130b are placed at a distance sufficient to allow currents to flow into the formation 102 (for example, formation current 134). In one or more embodiments, the source button 130a and the return button 130b are placed at least two feet apart.

In certain embodiments, the isolation layers 120 have the same thickness throughout the axial length of the isolation layers 120 while in other embodiments, the isolation layers 120 have a varying thickness throughout the axial length of the isolation layers 120. In any embodiment, the isolation layers 120 and buttons 130 may be placed at any location along the downhole tool 111. In certain embodiments, a plurality of source buttons 130a and a plurality of return buttons 130b are located at any position along the downhole tool 111. In certain embodiments, the source button 130a is located above the return button 130b while in other embodiments, the return button 130b is located above the source button 130a. While FIGS. 4A through 4D depict buttons 130 and isolation layers 120 being the same size, in certain embodiments, buttons 130 and isolation layers 120 may vary such that source button 130a may have a different dimension than return button 130b. In certain embodiments, one or more button(s) 130 may be located at the surface 105. For example, one of the return buttons 130b or the source buttons 130a may be located at the surface 105 of the formation.

The downhole tool 111 in the previous embodiments shown in FIGS. 1-5B are generally configured to provide ranging measurements as the downhole tool 111 is rotated, which can include incremental rotation. The rotation of the downhole tool 111 can provide a sweep of the surrounding formation 102 for ranging to the target well(s) by rotating the downhole tool 111 (or more specifically, the drill bit 113) with the drill string 108. The one or more embodiments discussed with regard to FIGS. 6-11 are generally related to collecting ranging and formation resistivity measurements while the downhole tool 111 is not rotating. However, it should be understood the one or more embodiments related to FIGS. 6-11 can also function to collect ranging data while the downhole tool 111 is rotating.

Figure 6:
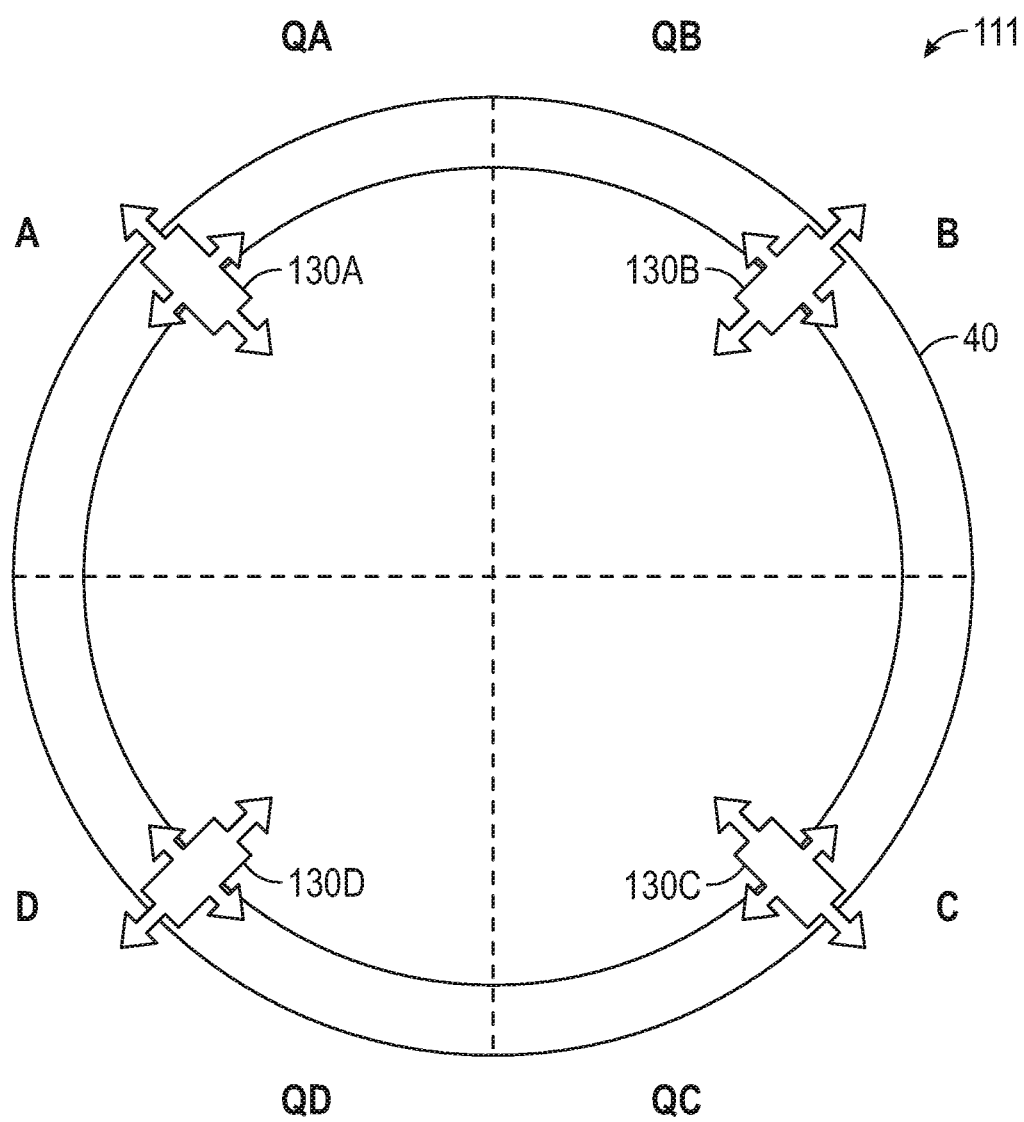
FIG. 6 is a representative cross-sectional view of an example button ranging system showing example circumferential spacing of buttons around a ranging tool body, according to one or more embodiments of the present disclosure.

Referring to FIG. 6, in one embodiment, an array of four button electrodes 130 is shown, with each button 130 positioned in a respective quadrant QA, QB, QC, QD and circumferentially spaced apart at equal-distances from each other around a mandrel 40 of the downhole tool 111. Each button can be assigned a quadrant identifier to associate it with its respective quadrant. It should be understood that more or fewer buttons 130 can be used, as well as varied spacing between each button 130A-D. However, it is preferred that the buttons be equally spaced around the mandrel. This configuration in FIG. 6 can be referred to as a ring of button electrodes 130A-D. Multiple rings of button electrodes 130A-D can be included in the downhole tool 111. The button electrodes 130A-D can be directional electrodes that emit current into the formation in a focused direction which provides increased azimuthal signal power compared to non-directional electrodes that have a wider range of current emissions but decreased azimuthal signal power. The ring arrangement of the buttons 130A-D can be used to simulate a rotating button without the downhole tool 111 being rotated. If the button 130A in quadrant QA is energized (i.e. turned ON) with the buttons in the other quadrants turned OFF during time period T1, then the button 130B in quadrant QB is energized (i.e. turned ON) with the buttons in the other quadrants turned OFF during time period T2, then the button 130C in quadrant QC is energized (i.e. turned ON) with the buttons in the other quadrants turned OFF during time period T3, then the button 130D in quadrant QD is energized (i.e. turned ON) with the buttons in the other quadrants turned OFF during time period T4, and then repeat the cycle, the result can be referred to as a virtual rotation. In this example, the virtual rotation would be similar to a single button 130 as it progresses around the mandrel 40. The selective turning OFF and ON of buttons 130A-D in the button ring can simulate the rotation of one or more buttons, without the downhole tool 111 rotating.

Figure 7:
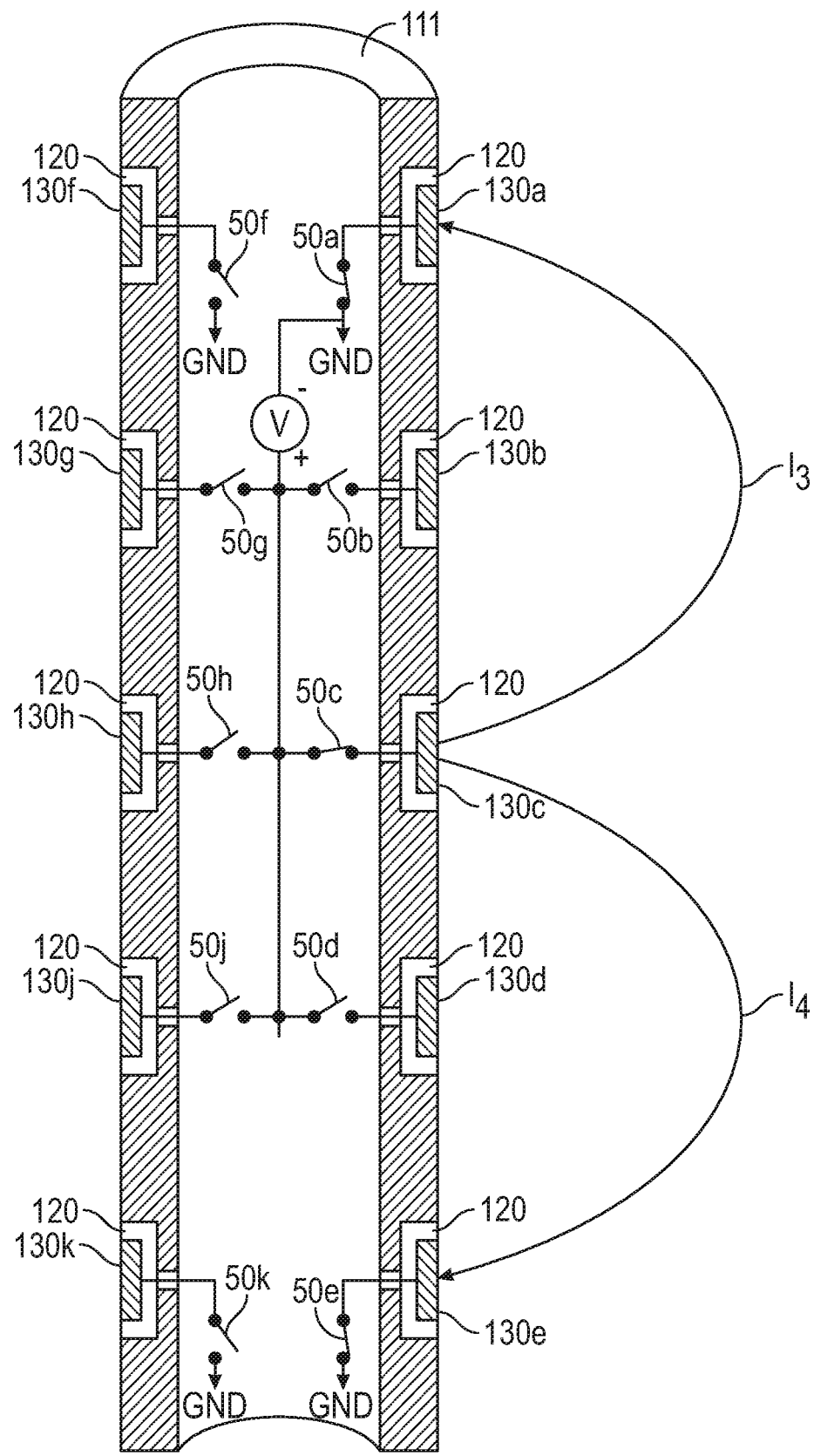
FIG. 7 is a representative cross-sectional view of an example button ranging system showing example longitudinal spacing of button electrodes along a ranging tool body, according to one or more embodiments of the present disclosure.

Referring to FIG. 7, in one embodiment, multiple button rings are provided in the downhole tool 111, with only two buttons visible in each ring. For example, a first button ring can include buttons 130f and 130a, a second button ring can include buttons 130g and 130b, a third button ring can include buttons 130h and 130c, a fourth button ring can include buttons 130j and 130d, and a fifth button ring can include buttons 130k and 130e. If each ring included four buttons, as shown in FIG. 6, then there would be two buttons in each ring not shown in FIG. 7. In this example, the first and fifth rings can be designated as buttons with a negative potential, with the other rings (the $2^{nd}$, $3^{rd}$, and $4^{th}$ rings) being selectively energized as positive potential rings. It should be understood that the negative and positive designations for the rings can be swapped. It is desired that at least one ring is a positive potential ring (i.e. containing positive potential buttons 130) with at least one other ring being a negative potential ring (i.e. containing negative potential buttons 130). The opposing electrodes 130 are used to inject current into the formation 102. The negative potential and positive potential connections can be selectable. Therefore, to create a current in the formation 102, at least one negative potential button and at least one positive potential button is selected by connecting these buttons to their respective potential sources.

FIG. 7 shows a representative cross-sectional view of the downhole tool 111 with a functional diagram of switching circuitry for selectively energizing and de-energizing the button electrodes 130a-k. In this example, switches 50a-k can be used to selectively connect and disconnect the button electrodes 130a-k to the positive potential (Voltage V) and the negative potential (i.e. ground GND). Note also in other embodiments, V may be an AC source. The formation currents I3 and I4 are created by closing switches 50a, 50c, and 50e. The switch 50c connects the button 130c to the voltage V, while the switches 50a and 50e connect the buttons 130a and 130e to ground GND, respectively. Since the material 120 insulates the buttons 130a-k from the mandrel 40, the current injected from the button 130c can travel through the formation 102 to the buttons 130a, 130e via the current paths I3 and I4. If only the current path I3 was desired, then the switch 50e can be opened and all the current from the button 130c would travel through the current path I3. Deeper and shallower penetration depths of the formation currents (e.g. I3, I4) can be provided by controlling the switches 50a-k. If a deeper penetration of the formation 102 was desired, then a button pair (one negative button and one positive button) can be selected that is spaced further apart from each other. For example, switches 50b and 50e can be closed, with all others open, thereby selecting button 130b as the positive button and button 130e as the negative button. Since these buttons 130b, 130e are spaced further apart (assuming an injection current of the same amplitude), a current from the button 130b, through the formation, and to the button 130e would tend to extend further into the formation than the current paths I3 or I4. If shallower penetration of the formation 102 was desired, then a button pair can be selected that is spaced closer together. For example, switches 50b and 50a can be closed, with all others open, thereby selecting button 130b as the positive button and button 130a as the negative button. Since these buttons 130b, 130a are spaced closer together (assuming an injection current of the same amplitude), a current from the button 130b, through the formation, and to the button 130a would tend to not extend as far into the formation as the current paths I3 or I4. It should be understood that the button configuration shown in FIG. 7 and the current injected into the formation 102 can also be used for resistivity measurements of the formation 102.

If the downhole tool 111 is not rotating, then a virtual rotation of tool 111 can be performed by using these various configurations of the array of buttons in the tool 111 of FIG. 7 by matching the switch configuration for each quadrant during sequential time periods. Each quadrant can be seen as being similar to the right-hand side of the buttons and switches in the cross-sectional view of FIG. 7. In time period T1, for example, the switches in quadrant QA can be configured as in FIG. 7. In time period T2, the switches in quadrant QB can be configured similarly, with the switches in quadrant QA being OPEN. Time period T3 would then configure the switches in quadrant QC and time period T4 would configure the switches in quadrant QC. As above, regarding FIG. 6, this sequence can continue to perform virtual rotation of the ranging measurement tool 111.

Figure 8:
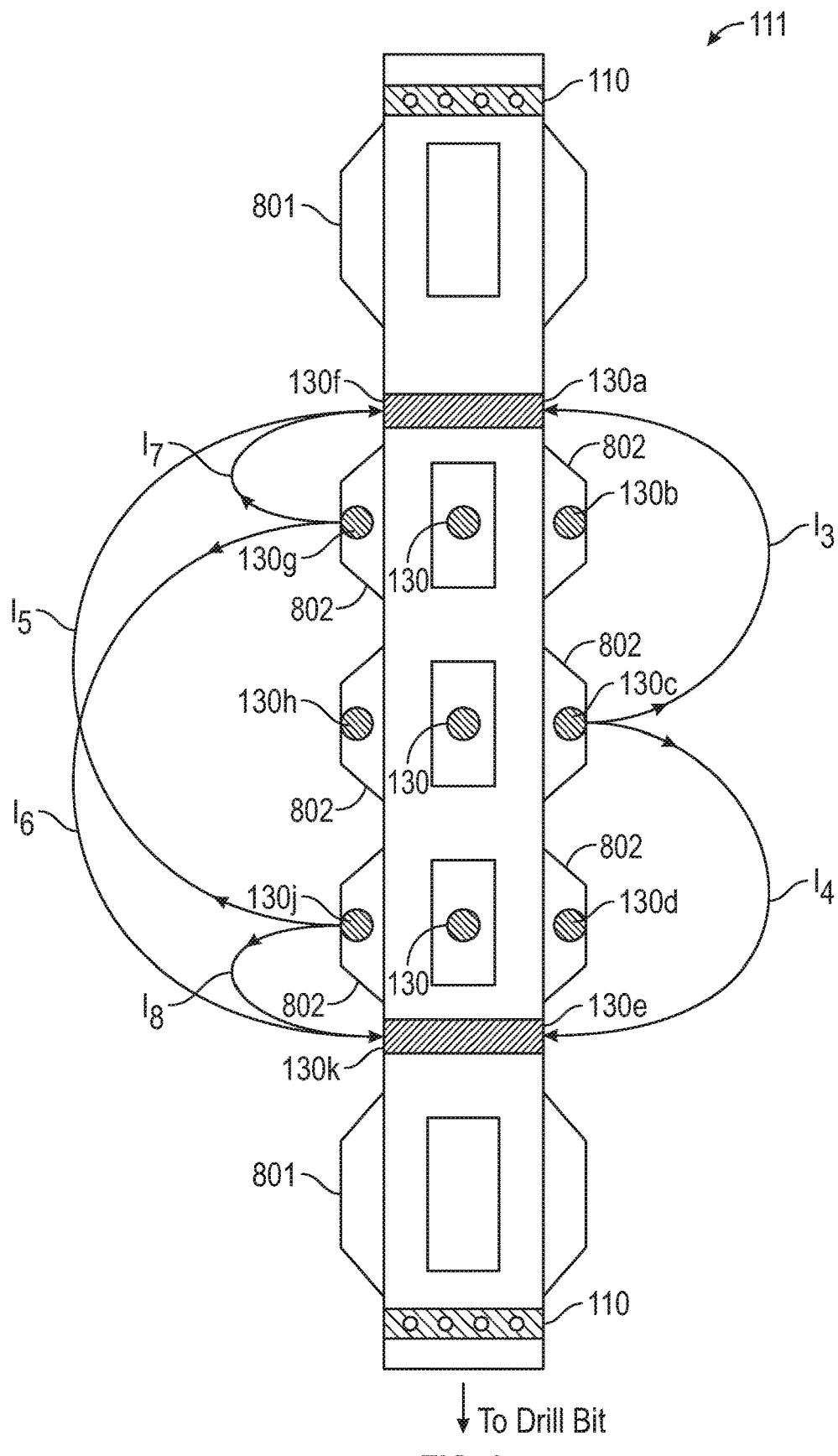
FIG. 8 is a representative side view of an example button ranging system showing example longitudinal and circumferential spacing of button electrodes on a ranging tool body, according to one or more embodiments of the present disclosure.

FIG. 8 shows a representative side view of an example of the downhole tool 111, which is similar to the tool 111 of FIG. 7, with 5 button rings axially separated along tool 111. The top and bottom rings being selectable negative potential rings with the middle three rings being selectable positive potential rings. In this example, the middle three electrode rings have their respective individual electrodes installed in straight stabilizer blades 802. The isolation layers 120 are not shown. In one or more embodiments, the isolation layers 120 and the buttons 130 of the three middle electrode rings are installed such that the top surfaces of the isolation layers 120 and the buttons 130 do not exceed the outer surface of the stabilizer blades 802. In other embodiments, the top surface of one or more of the isolation layers 120 and the buttons 130 may exceed the outer surface of the stabilizer blades 802. The stabilizer blades 802 extend out radially from the drilling tool 111 at a same height matching the height of the stabilizer blades 801. In other embodiments, the height of stabilizer blades 802 is larger or shorter than the height of stabilizer blades 801. In other embodiments, the middle three electrode rings individual electrodes are installed in one of spiral, integral, or welded stabilizer blades. In other embodiments, the electrode rings individual electrodes are not installed in stabilizer blades as shown in FIG. 4B. Although in FIG. 8 downhole tool 111 consist of 5 electrode rings, it is understood that the downhole tool 111 can have more than 5 electrode rings or less than 5 electrode rings.

As in FIG. 7, each button can be individually selected. Formation currents I3 and I4 can be created by energizing button 130c and injecting current into the formation that splits into paths I3 and I4 to reach buttons 130a and 130e. The top and bottom rings can include various types of grounding material that can be selectively coupled to a negative potential. It should be understood the top and bottom rings could be installed in stabilizer blades or remain flush with the outer surface of the mandrel. Deeper penetration can be provided by selecting a button pair (130J, 103f) to inject current I5 into the formation 102, or a button pair (130g, 103k) to inject current 16 into the formation 102. Shallower penetration can be provided by selecting a button pair (130j, 103k) to inject current 18 into the formation 102, or a button pair (130g, 103f) to inject current 17 into the formation 102. Many other variations of button pairs can be selected, as well as having more rings of buttons added to the array. It should be understood that changes in the depth of penetration of the formation currents can also be caused by varying the intensity of the injected current and increasing the duration of the current injection.

FIG. 8 also includes two rings of receivers 110 (e.g. magnetometers) which can be used to sense the secondary magnetic fields induced in the formation 102 by the formation currents that interact with the target conductive tubing string. It is preferred that these rings of receivers 110 include multiple receivers 110 (e.g. 6 receivers) that are equally spaced circumferentially around the tool 111 (or BHA, etc.).

During the virtual rotation of the downhole tool 111, the buttons are selectively energized or "fired" using sequencing parameters. For example, the buttons may be selectively fired for a time period which will be referred to as a firing duration. The firing duration is the amount of time the particular button electrode 130 is energized before being de-energized. Increasing the firing duration can increase the depth of penetration of the injected current into the formation 102. Reducing the firing duration can decrease the depth of penetration of the injected current into the formation 102. Additionally, higher frequencies of injected current can decrease the depth of penetration, while lower frequencies of injected current can increase the depth of penetration. Therefore, when planning the desired depth of penetration of the downhole tool 111 at desired location in the formation 102, a firing map can be generated to establish such sequencing parameters that will be used during a ranging operation. The sequencing parameters of the firing map can include, for example, the intensity of the injected current when the button is energized, the firing duration of each button, the frequency of the injected current when the button is energized, and which pair of buttons are selected during the virtual rotation of the downhole tool 111.

The generation of the firing map can be part of a pre-well plan or pre-ranging plan before drilling operations start. In one example, a repository can be prepopulated with a plurality of firing maps based on the anticipated formation 102 environment. The anticipated formation 102 environment can be determined using preexisting formation data from previous surveys and previous formation evaluations of formation 102. The firing map parameters can be generated using preexisting well data or be based on mathematical models that anticipate the formation environment at certain drilling positions within formation 102. Alternatively, a combination of previous well data and mathematical models can be used to generate the firing maps and prepopulate the repository prior to commencing the drilling operation. The repository of firing maps can be updated in real-time during the drilling operation. Since the drilling tool 111 electrode ring configuration 130 serves the dual purpose of making formation resistivity measurements, new firing maps can be generated in real-time based on real-time ranging operations and real-time formation 102 resistivity measurements.

Figure 9:
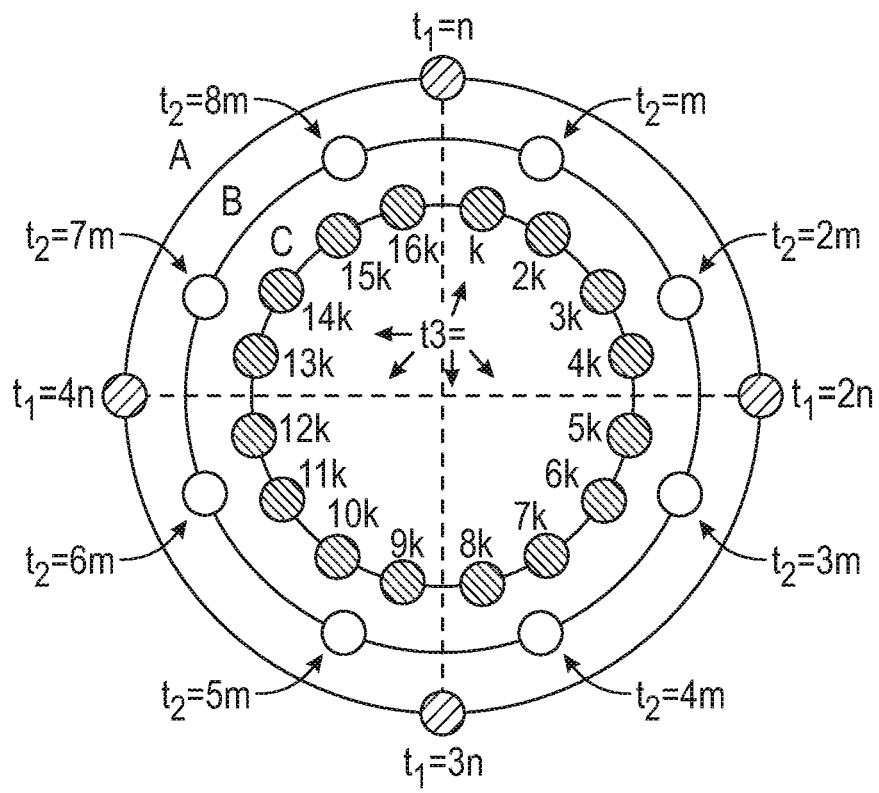
FIG. 9 is a representative circular timing diagram for three different firing sequences for a button electrode in the example button ranging system of either FIGS. 7 and/or 8, according to one or more embodiments of the present disclosure.
Figure 10:
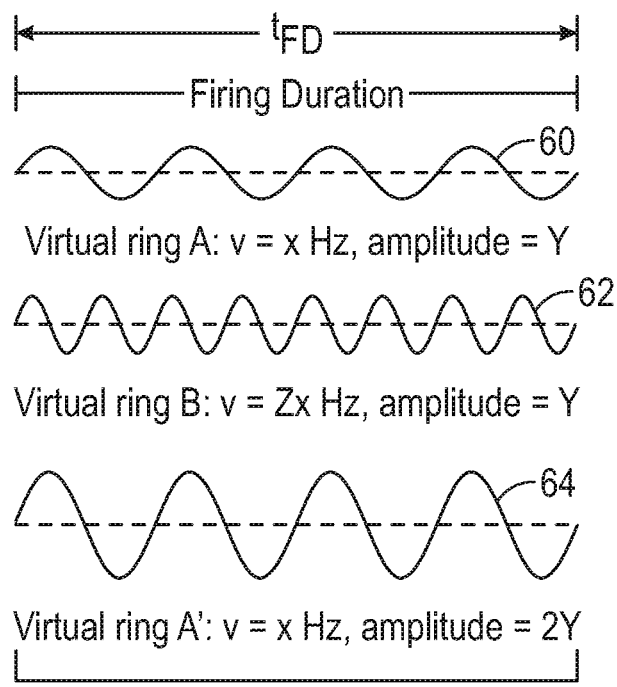
FIG. 10 is a representative diagram of example signals that can be transmitted by the button electrode of FIG. 9, according to one or more embodiments of the present disclosure.

FIG. 9 shows an example of a firing map for a single button in the downhole tool 111. For purposes of discussion, this example firing map can be a firing map for the button 130A in FIG. 6. The other buttons 130B-D can have independent firing maps that can be related to the firing map of button 130A. These firing maps can be the same as or different from the example firing map for button 130A shown in FIG. 6. Please note that the ring configuration of the firing map is useful for demonstrating the cyclical nature of the firing sequence of the button 130A as it is participating in the virtual rotation of the downhole tool 111, but these circles are not correlated to a position of the button 130A in the button ring in FIG. 6. These timing rings (A, B, C) indicate the periods of time the button 130A is energized and not energized.

The operation of the firing map related to the example timing ring A will be discussed first and then the operation of the other timing rings (B, C) will be discussed in relation to the timing ring A. According to the timing ring A, the button 130A is energized at T1=n for a predetermined firing duration, current injection frequency, and current injection amplitude (or intensity). For example, referring to FIG. 10, the button 130A can output a current signal 60 for a firing duration $T_{fd}$ that has a frequency of "x" Hz and an amplitude "y." This current signal 60 can be injected into the formation as formation currents I3 and I4 shown in FIG. 7, or similar currents I5-I8 in FIG. 8. At time T1=2n, the button 130A can again output a current signal 60 for a firing duration $T_{fd}$ (which can be a different duration than at T1=n). However, the current signal at time T1=2n can have different frequencies and amplitudes, such as signals 62 and 64 shown in FIG. 10.

Before the button 130A fires again at time T1=2n, each of the buttons 130B-D would have preferably fired once, with each of the firings being done at equal time intervals from each other. For example, after button 130A fires at time T1=n, button 130B may fire at a time that is T1=n+n/4, then button 130C may fire at a time that is T1=n+2n/4, and then button 130D may fire at a time that is T1=n+3n/4, before button 103A fires again at time that is T1=2n. Therefore, during the time period between T1=n and T1=2n, the other buttons 130B-D can be fired at regular intervals. This firing sequence can continue as the firing map in FIG. 9 shows. However, the firing maps for the buttons 130B-D are not shown in FIG. 9. The button ring containing the buttons 130A-D can simulate a single button rotating around in the second (or relief) well by sequentially firing the buttons 130A-D in the button ring shown in FIG. 6. The button ring containing the buttons 130A-D can simulate 2 buttons rotating around in the second well by sequentially firing buttons 130A,C together and buttons 130B,D together. An alternative would be to sequentially fire buttons 130A,B together and 130C,D together to simulate 2 buttons rotating in the second well. It will be appreciated that each electrode ring can contain more than 4 buttons and can simulate more than 2 buttons rotating around in the second well. For example, each electrode ring can contain 6 buttons evenly space about the circumference of the tool and can simulate 3 buttons rotating around in the second well. It will be appreciated that the number of buttons in each ring need not be an even integer.

The timing rings B and C of the firing map in FIG. 9 can be used to simulate rotations at higher RPMs by firing the buttons 130A-D at faster rates. Referring to timing ring B, the button 103A can be fired at time T2=m, with the other three buttons 130B-D being fired at regular intervals prior to button 130A being fired again at time T2=2m. This same process can be used to fire the button 130A according to the timing ring C. These timing rings can be used individually for controlling the firing of the button 130A. However, a benefit of the current disclosure is that a button ring, like the one shown in FIG. 6 can be used to simultaneously simulate the rotation of several buttons a different RPMs. Since each timing ring A, B, C is associated with a button rotation (i.e. RPM of the downhole tool 111), then following the firing map of all three rings simultaneously can simulate a button rotating at three different RPMs where each timing ring can have its own firing duration $T_{fd}$, frequency (Hz) and amplitude. To accomplish this, the button 130A can fire once at time T1=n. It would then fire again at time T3=k, then again at times T2=m, T3=2k, T3=3k, T2=2m, and T3=4k before firing at T1=2n and starting the sequential firing again for the next quadrant of the firing map. With the other three buttons 130B-D also firing in similar sequences, but slightly offset from the button 130A firing map, three buttons traveling at three different RPMs can be simulated by the current button ring of FIG. 6 and the firing map of FIG. 9. It should be understood that the selective and sequential firing of the buttons produce a time-varying electromagnetic field where the time-varying electromagnetic field characteristics can be altered by the firing map parameters.

Moreover, in certain alternative embodiments, if the tool is rotating and the target well has been located, the information handling system may execute a firing map to fire the buttons such that they simulate a backward rotation and thus keep the signal transmitted relatively fixed in space. For example, in such an embodiment, the speed at which the electrodes are firing would be correlated to the speed at which the tool is rotating such that the total signal transmitted would appear fixed in place. Such embodiments would be useful in keeping a lock on an object once it has been detected. In this embodiment, an orientation sensor as described herein (e.g., an azimuthal orientation indicator) may be continually monitored at a sufficient rate by the information handling system to allow it to shift the phases of the electrodes so as to keep the beam on the target, even as the position of the drilling tool changes with respect to the target.

The information handling system 200 in FIG. 2 can be used to control the execution of the firing maps for all buttons in the downhole tool 111, as well as controlling the selection of positive and negative potential buttons in the button array, and processing the sensor data collected by the receivers 110. Through this control of the variables in the ranging system, a very versatile ranging operation can be implemented, even when the downhole tool 111 is not rotating.

It should also be understood that the downhole tool 111 of the current disclosure can also be used while the downhole tool 111 is being rotated, such as when the drill bit is extending the second well. With target wells at a substantial distance, the rotating downhole tool 111 can more easily distinguish a direction of the target well in reference to the second well being drilled by the drill bit 113. However, as the second well approaches the target well, noise can be experienced with rotating ranging tools and non-directional electrodes. Therefore, it can be beneficial to employ the ranging system with the virtual rotating buttons when the second well (e.g. borehole 106 in FIG. 1) approaches the target well (e.g. borehole 103 in FIG. 1), whether the second well is going to intersect the target well, merely run parallel to the target well, or avoid the target well. As the second well approaches the target well, the drill bit 113 can periodically stop rotating to allow the downhole tool 111 to take ranging measurements using the virtual rotation of the buttons as described above. It should be understood, in certain embodiments, the downhole tool 111 of the current disclosure can perform the disclosed ranging techniques while the drill bit 113 (and thus the tool 111) is rotating. However, to make better and clearer ranging measurements when the second well is in close proximity (e.g., 10 ft or less) to the target well, stopping physical rotation of the tool 111 and the drill bit 113, and making ranging measurements with the virtual rotation of the buttons in the downhole tool 111 reduces the noise in the imagery and/or measurements taken. Therefore, the reduced noise measurements can aid in better interpretation of the collected ranging data.

Figure 11:
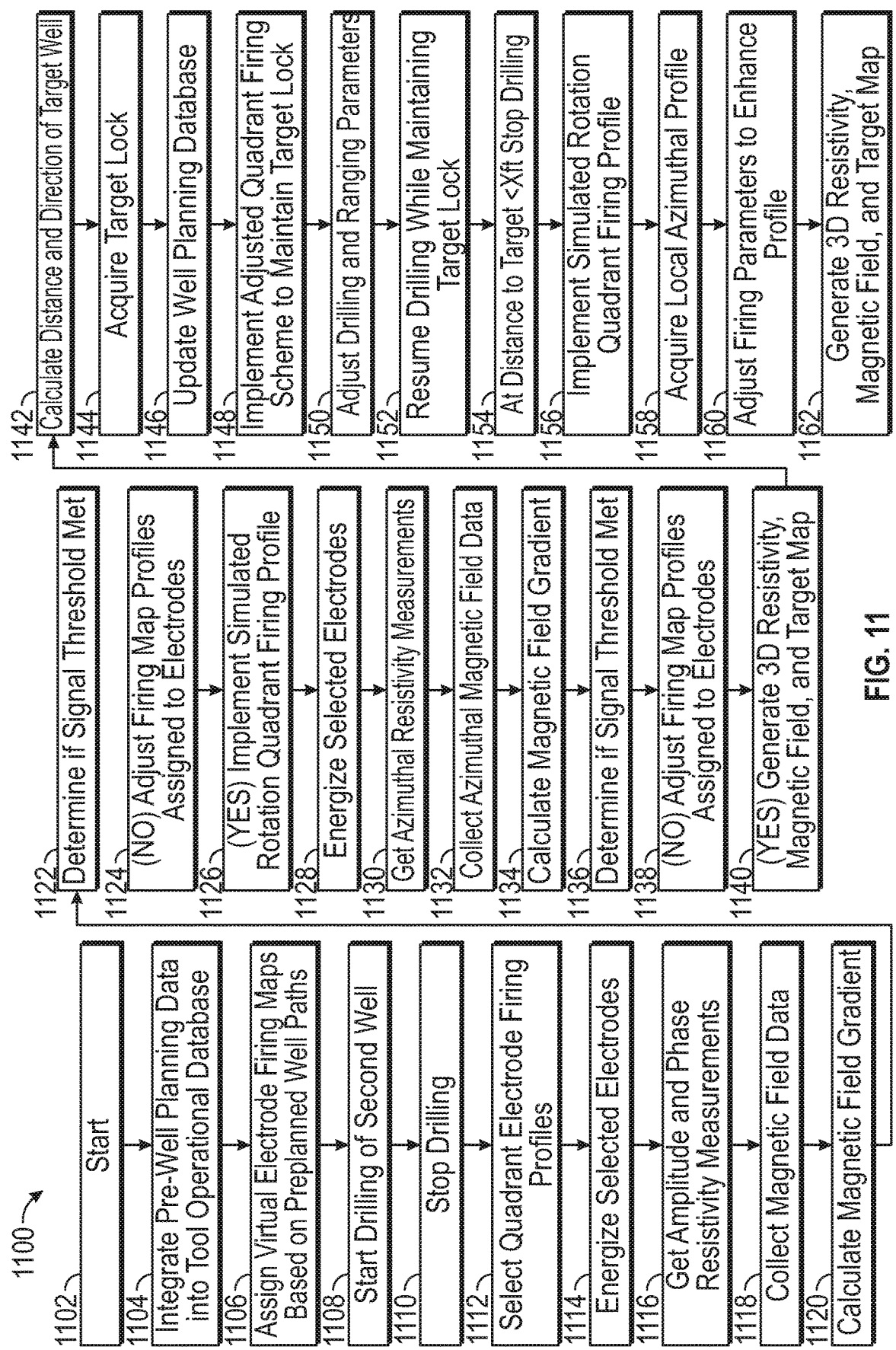
FIG. 11 is a flowchart of an example method for excitation of buttons for a ranging application, according to one or more embodiments of the present disclosure.

FIG. 11 is a flow chart of an example method 1100 for ranging operations. The method 1100 can include one or more of the operations 1102-1162 shown in FIG. 11, as well as additional operations not shown. This is but one example of a method that can utilize the downhole tool 111 of the current disclosure in ranging operations. The method 1100 can begin at operation 1102 which can be used to initialize the equipment and begin preparation for a ranging operation. Pre-well planning data can be determined and integrated into a downhole tool 111 operational database at operation 1104. This pre-well planning data can include the firing maps for each button electrode 130 and the switching algorithms for selecting the positive and negative potential buttons 130, as well as other tool 111 setup. Note, in certain embodiments, the firing maps may include the switching algorithms. The pre-well planning data also establishes a desired signal threshold that can be compared with real-time formation resistivity and ranging measurements during the ranging operation. Operation 1106 can assign virtual electrode firing maps based on the preplanned well data, and any preplanned well paths of the second (or relief) well 141. Operation 1108 can start the drilling of the borehole 106 of the second well 141 until stopped at operation 1110. In operation 1112, the quadrant electrode 130 firing profiles can be selected, and the electrodes can be selectively energized in operation 1114. In operation 1116, amplitude and phase resistivity measurements can be collected using the injected current 134 into the formation 102 and the resistivity measurements taken by the downhole tool 111.

In operation 1118, magnetic field data can be collected by the receivers 110 in response to the injected current 134 from the energized buttons 130. In operation 1120, a magnetic field gradient can be calculated based on the magnetic field data collected in operation 1118. In operation 1122, a signal threshold can be calculated and compared to a desired signal threshold to see if the desired threshold has been met. If not, the firing map profiles assigned to the electrodes 130 can be adjusted in operation 1124. If the threshold has been met, then the simulated rotation quadrant firing profile can be implemented in operation 1126. In operation 1128, selected electrodes can be energized, and azimuthal resistivity measurements and azimuthal magnetic field measurements can be performed in operations 1130 and 1132. In operation 1134, a magnetic field gradient can again be calculated based on the magnetic field measurements collected in operation 1132. In operation 1136, a signal threshold can again be calculated and compared to a desired signal threshold to see if the desired threshold has been met. If not, the firing map profiles assigned to the electrodes 130 can be adjusted in operation 1138. If the threshold has been met, then 3D resistivity, magnetic field, and target maps can be generated in operation 1140.

In operation 1142, a distance and direction of the target borehole 103 of the target well 142 relative to the borehole 103 of the second well 141 can be calculated. A target lock of the relative distance and location of the target borehole 103 can be acquired in operation 1144. The relative distance and location of the target borehole 103 can be compared to the expected location of the borehole 103 and any corrections to the well-planning database can be made at operation 1146, depending upon the actual location (and direction) of the target borehole 103. In operation 1148, the quadrant firing schemes can be adjusted to maintain the target lock on the borehole 103. Here, maintaining the target lock may consist of adjusting firing map parameters and prioritizing quadrants in the azimuthal direction of the target during subsequent firings.

In operation 1150, the drilling and ranging parameters of the borehole 106 of the second well 141 can be adjusted. In operation 1152, drilling of the borehole 106 can resume while maintaining the target lock with the target borehole 103. When the drill string is rotating, a target lock is maintained by determining the orientation and position of the downhole tool 111 with respect to the target in real-time, and what quadrants should be prioritized based on the last known locked target position with respect to the drilling tool 111 orientation. Here, the orientation and position of the locked target with respect to the drilling tool 111 may be tracked using, for example, a combination of known formation 102 characteristics obtained via resistivity measurements and/or computationally using an azimuthal orientation indicator, which may include magnetometers, inclinometers, and/or accelerometers, though other sensor types such as gyroscopes may be used in some embodiments. In operation 1154, when the relative distance to the target borehole 103 is less than a predetermined distance of "X" ft., then drilling of the borehole 106 can be stopped. In operation 1156, the simulated rotation quadrant firing profile can again be implemented. In operation 1158, a local azimuthal profile can be acquired. In operation 1160, firing parameters of the buttons can be adjusted to enhance a ranging profile. In operation 1162, 3D resistivity, magnetic field, and target maps can again be generated based on the new data measurements.

Figure 12:
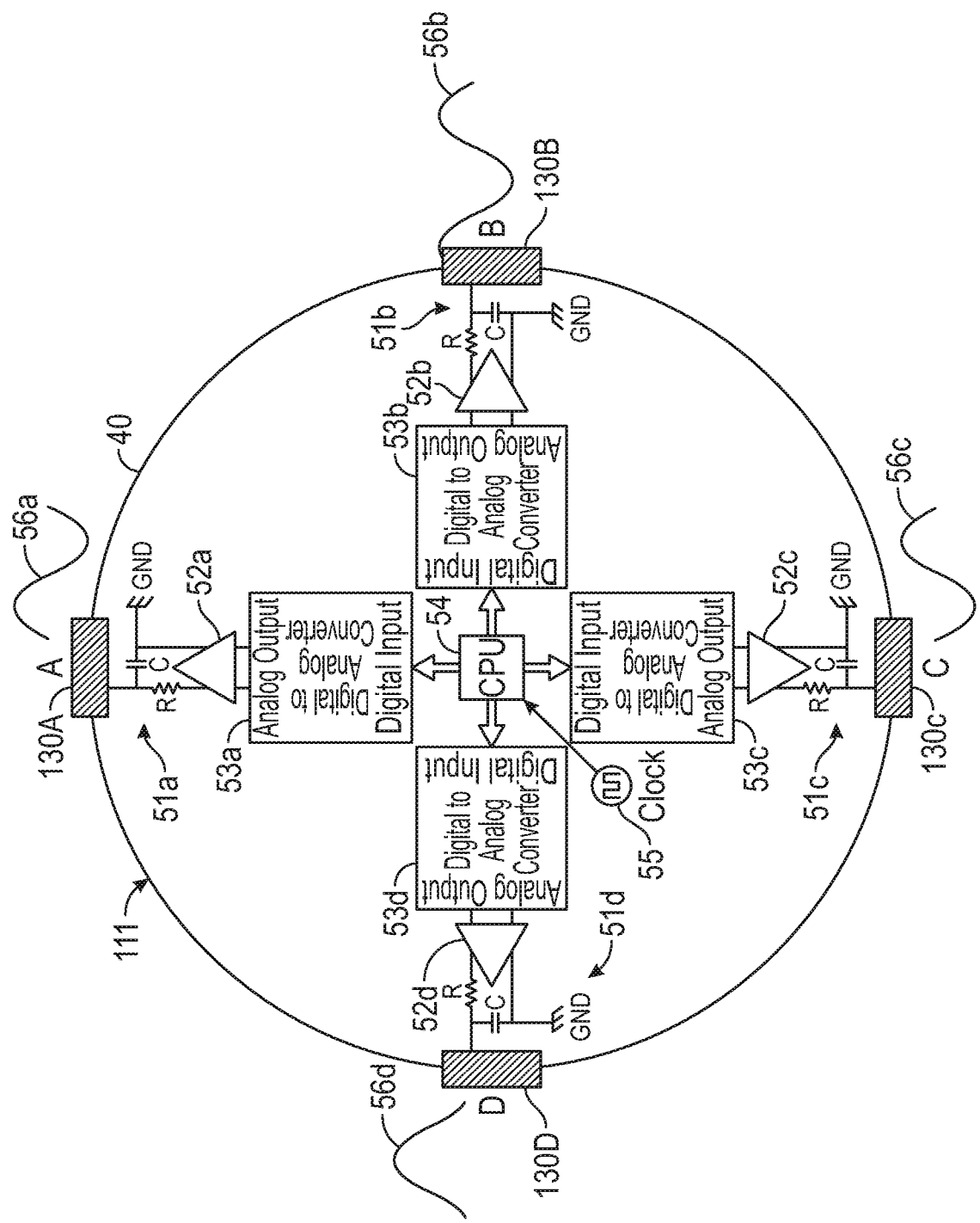
FIG. 12 is a representative block diagram of a circumferential array of buttons 130A-D in the mandrel of the tool, according to certain embodiments of the present disclosure.

FIG. 12 is a representative block diagram of a circumferential array of buttons 130A-D in the mandrel 40 of the tool 111 that can be controlled by one or more processors (e.g. CPU 54). The CPU 54 can receive a clock 55 and use the clock 55 to provide synchronization for the selective control of exciting the buttons 130A-D. The CPU 54 can communicate to the D/A converter 53*a* to excite the button 130A via the amplifier 52*a* and the filter circuitry 51*a*. In this example, the button 130A is controlled to output a sine wave signal 56*a*. By similarly communicating to the remaining buttons 130B-D, through respective converters 53*b-d*, amplifiers 52*b-d*, and filter circuitries 51*b-d*, the CPU 54 can control the buttons 130B-D to output respective signals 56*b-d*, which can be sine wave signals 56*b-d* that are phase-shifted from the signal 56*a*. By outputting signals 56*a-d* that are phase-shifted from each other (in this example each signal 56*a-d* is shifted approximately 90 degrees from the signal of its neighboring button). This can be used, as well as other control schemes, to cause the excitation of the buttons 130A-D to simulate a virtual rotation of the tool 111, without the tool 111 actually rotating. Of course, the tool 111 can also be physically rotated during this virtual rotation.

Figure 13:
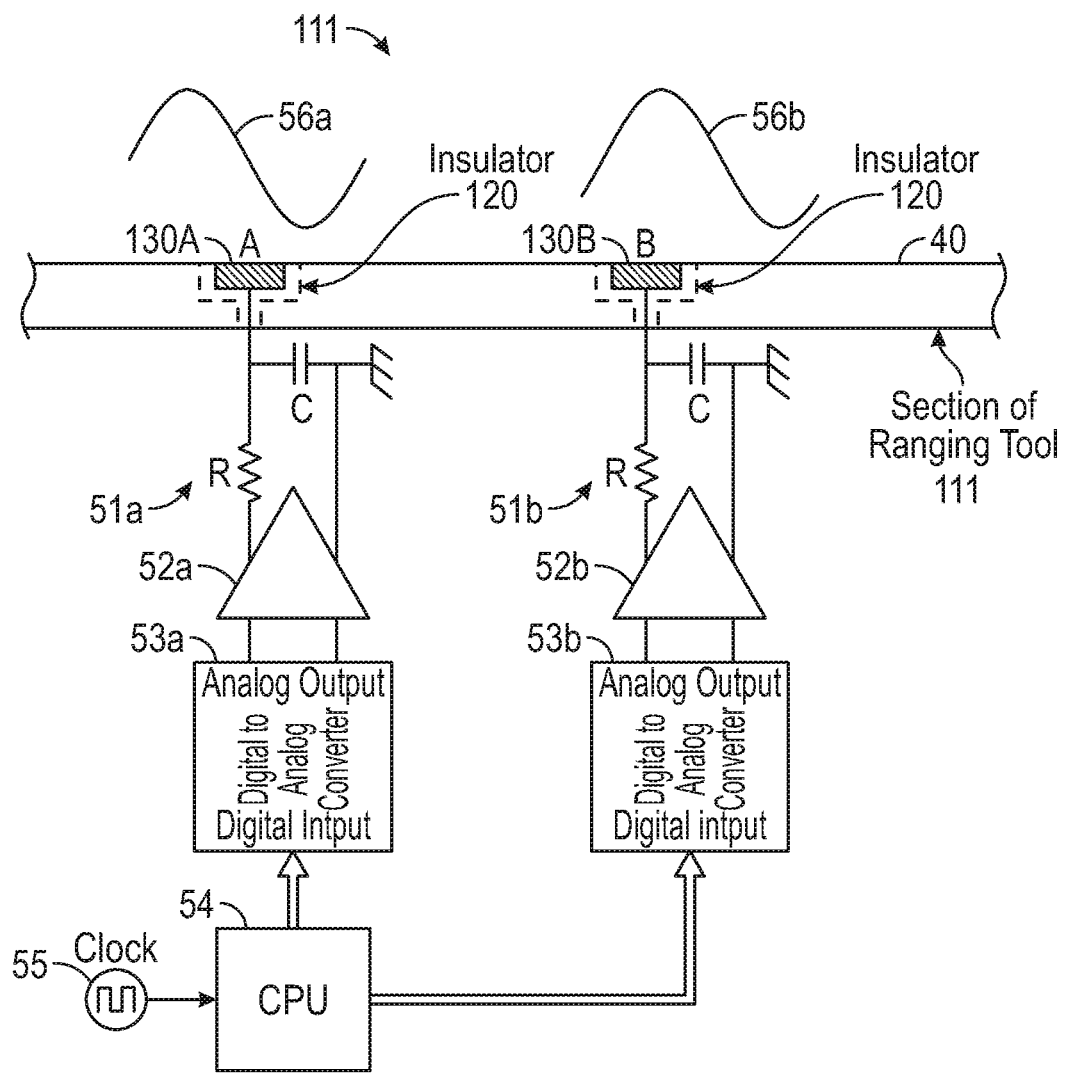
FIG. 13 is a representative block diagram of a longitudinally/axially spaced array of buttons 130A-B in the mandrel of the tool, according to certain embodiments of the present disclosure.

Sine waves 56*a-d* can be synthesized by the CPU 54 and output to the D/A converters 53*a-d*. The frequency of the sine wave 56*a-d* can correspond to the frequency of the virtual rotation. The sine waves 56*a-d* can be generated at a frequency significantly above the frequency of the virtual rotation (e.g. at least an order of magnitude higher). Thus, four separate data streams can be generated of digital representations of discrete sine waves 56*a-d*. Each data stream can be connected to a D/A converter which produces an analog signal corresponding to the digital data input stream. Each analog signal can be fed to an amplifier 52*a-d*. Optionally, the output of each amplifier 52*a-d* can be low-pass filtered via circuitry 51*a-d*, respectively, as shown in FIGS. 12, 13. These filters 51*a-d* can be placed at the outputs of the D/A converters 52*a-d*. The product R*C of the circuitry 51*a-d* can determine a time constant, the inverse of which can determine approximately where the high frequency roll-off of the filters occurs. This can be selected such that the discrete steps in the output of the digital to analog converter are minimized while the lower frequency sine wave passes through the filter with minimal distortion. The design of R-C filters is well known to those skilled in the art and will not be discussed in further detail in this disclosure. The optionally filtered output of each amplifier 52a-d can drive an electrode with reference to ground or a toroid with both outputs of the filter connected to opposite ends of the toroid.

Described in more detail, the electrodes 130A-D can each be excited by a sine wave of the same amplitude and frequency, but of a different phase relative to each other as dictated by a firing profile. The sine wave 56b synthesized to drive electrode (or toroid) 130B can be advanced by 90 degrees with respect to the sine wave 56a synthesized to drive electrode (or toroid) 130A. Similarly, the sine wave 56c synthesized to drive electrode (or toroid) 130C can be advanced by 90 degrees with respect to the sine wave 56b synthesized to drive electrode (or toroid) 130B, and the sine wave 56d synthesized to drive electrode (or toroid) 130D can be advanced by 90 degrees with respect to the sine wave 56c that is synthesized to drive electrode (or toroid) 130C. This can result in a net rotation of the response pattern around the electrodes 130A-D.

According to one or more embodiments, and similar to the discussion of virtual rotation of electrodes in reference to FIG. 7, when the signal driving electrode 130A in FIG. 12 is zero, the signal driving electrode 130B can be either at a maximum or a minimum of the sine wave and likewise, when the signal driving electrode 130B in FIG. 12 is zero, the signal driving electrode 130A can be either at a maximum or a minimum of the sine wave. Thus, when electrode 130A is driven at its maximum, electrodes 130B and 130D are not driven, while electrodes 130A and 130C are 180 degrees out of phase with each other and can act as a dipole source. Similarly, when electrode 130A is zero, electrode 130C is zero and electrodes 130B and 130D can be driven 180 degrees out of phase with each other and can act as a dipole source. At intermediate values of the amplitude of the signal driving electrode 130A, the system can act as a pair of orthogonal dipoles; when the drive at electrode 130A has advanced 45 degrees from a point where the signal on electrode 130A is null, then amplitudes of the signals driving 130A and 130B will be the same, and the system can act like a dipole transmitter at 45 degrees with respect to a line joining electrodes 130A and 130C. Therefore, the system shown in FIG. 12 can set up a rotating dipole field.

The signal generated by this rotating field can be received by any number of types of antennas as for example button electrodes, coils or magnetometers. In addition, it should be noted that the receivers 110 can be sampled synchronously. One way of sampling the receivers synchronously can be to synchronize the sample rate with the frequency of the signal driving the transmitters. This would be beneficial, e.g. if the receivers were arranged as a series of buttons circularly arranged around the body of the ranging tool as are the electrodes 130A-D in FIG. 12. Note that if the signals are received as data sets of finite duration, then assuming that a reference signal is available from one of the transmitters, the response pattern of the receivers can also be rotated synthetically just as the transmitter signals were rotated synthetically.

The excitation signals are not be restricted to sine waves. Two or more signals can be transmitted simultaneously and these signals could be transmitted from each electrode with the phase of each component shifted by the angular displacement of each electrode from one electrode, selected as the reference electrode. As an example, since a square wave is a superposition of harmonics of a sine wave at a fundamental frequency, synthetic switching can be carried out by exciting an electrode identified as a reference electrode with a square wave and then exciting the other electrodes with a square wave displaced by the fraction of a cycle that corresponds to the fraction of 360 degrees that each of the other electrodes is from the reference electrode.

When simultaneously using multiple sinusoidal excitations, it is not necessary that the multiple frequencies be in harmonic relation with one another. The phase of each sinusoidal component can be shifted according to the relation of the driven electrode relative to the reference electrode. More complex waveforms, such as e.g. sawtooth and trapezoidal waveforms can be used instead of the sine wave signals, but appropriate timing adjustments may need to be made to each of the complex waveforms.

FIG. 13 is a representative block diagram of a longitudinally/axially spaced array of buttons 130A-B in the mandrel 40 of the tool 111 that can be controlled by one or more processors (e.g. CPU 54). The CPU 54 can receive a clock 55 and use the clock 55 to provide synchronization for the selective control of exciting the buttons 130A-B. The CPU 54 can communicate to the D/A converter 53a to excite the button 130A via the amplifier 52a and the filter circuitry 51a. In this example, the button 130A is controlled to output a sine wave signal 56a. By similarly communicating to the other button 130B, through respective converter 53b, amplifier 52b, and filter circuitry 51b, the CPU 54 can control the button 130B to output respective signals 56b, which can be sine wave signal 56b that is phase-shifted from the signal 56a by outputting signals 56a-b that are phase-shifted from each other (in this example each signal 56a-b is shifted approximately 90 degrees from each other). This can be used, as well as other control schemes, to cause the excitation of the buttons 130A-B (and possibly more buttons) to simulate a virtual longitudinal movement of the tool 111, without the tool 111 actually moving longitudinally. Of course, the tool 111 can also be physically moved longitudinally during this virtual longitudinal movement.

According to one or more embodiments, and similar to the discussion of switching scheme of electrodes in reference to FIG. 7, the switching scheme can also be applied to electrodes distributed along the axis of the ranging tool body, as illustrated in FIG. 13. A section of the mandrel 40 of a ranging tool 111 is shown in FIG. 13 with two electrodes 130A and 130B. In this case, electrodes 130A and 130B may be driven out of phase with each other in order to affect a sweeping angle of highest sensitivity of the combined response pattern of both electrodes along the axis of the ranging tool 111. By modulating a phase difference between electrodes 130 in an array, it is possible to cause the effective rotation and/or longitudinal movement to have a linear rate of movement.

It should also be noted that the phase differences between the signals used to drive electrodes illustrated in FIG. 12 can also be modulated so as to control the time the swept response pattern spends at a particular response angle.

It should be further noted that rotational effects about the tool body as described with reference to FIG. 12 can be combined with rotational effects as described with reference to FIG. 13 to produce complex sweeping patterns for the response of the system. For example, a sweep pattern can be designed where the effective principle response axis follows a helix or a rotating back-and-forth pattern along the axis of the ranging tool.

It should be further noted that continuous rotation and sweeping methods as taught with reference to FIGS. 12 and 13 can be combined with the switching patterns as described with reference to FIG. 7. Thus, the continuous rotation and/or sweeping could be limited to certain time intervals or quadrants of the tool 111. This can be used to advantage when the response indicates that a metallic object is within the sensitive distance of the ranging tool 111. Combining switching and continuous rotation and/or sweeping, the location of the metallic object can be identified more quickly than can be done with a continuous rotation and/or sweep of the whole volume within the sense range of the ranging tool 111.

Therefore, as can be seen from this disclosure, virtual rotations and/or virtual longitudinal movements can be simulated while the tool 111 remains stationary in the wellbore. If various numbers of buttons are used in these configurations, the phase-shift of the signal output from adjacent buttons can be adjusted to accommodate for the more or fewer buttons in the array of buttons in the circumferential and/or longitudinal direction. It should be understood that the signals 56a-d can be various waveforms other than sine waves (such as square waves, saw-tooth waves, modulated waves, simultaneous use of switching signals and continuous signals, pulse trains, decaying).

In one or more embodiments, a method for downhole ranging within a formation comprises exciting a first button of a tool by a first source, wherein the tool is coupled to a drill string, wherein the first button is recessed within the tool such that a top surface of the first button does not exceed an outer surface of the tool, and wherein a first isolation layer electrically isolates the first button from the tool, receiving a first downhole measurement associated with the excitation of the first button, exciting a second button of the tool by a second source, wherein the second button is recessed within the tool such that a top surface of the second button does not exceed the outer surface of the tool, and wherein a second isolation layer electrically isolates the second button from the tool, receiving a second downhole measurement associated with the excitation of the second button, determining at least one of a direction, distance, and orientation to a target based, at least in part, on the first downhole measurement and the second downhole measurement and adjusting a drilling parameter based, at least in part, on the determined at least one of the direction, the distance, and the orientation to the target.

In one or more embodiments, the method for downhole ranging within a formation further comprises adjusting a rotation angle of the first button, exciting the first button at the rotation angle, receiving a third downhole measurement associated with the excitation of the first button at the rotation angle and adjusting the drilling parameter based, at least in part, on the third downhole measurement. In one or more embodiments, an azimuthal axis of the second button aligns with an azimuthal axis of the first button. In one or more embodiments, the first button and the second button are recessed in a groove of the tool. In one or more embodiments, the method for downhole ranging within a formation further comprises comparing at least one of a first signal magnitude associated with the first button and a second signal magnitude associated with the second button to a predicted signal magnitude to obtain a first value, wherein the predicted signal magnitude is based, at least in part, on a ranging model, determining a presence of the target based, at least in part, on the first value exceeding a threshold and adjusting the drilling parameter based, at least in part, on the determining the presence of the target.

In one or more embodiments, the method for downhole ranging within a formation further comprises determining a first weight associated with the first signal magnitude and a second weight associated with the second signal magnitude, determining a regularization value from a regularization function based, at least in part, on the first weight and the second weight, determining a cost value from a cost function based, at least in part, on the regularization value and adjusting the drilling parameter based, at least in part, on the cost value. In one or more embodiments, the predicted signal magnitude is based, at least in part, on no target being present. In one or more embodiments, the method for downhole ranging within a formation further comprises maintaining a non-azimuthal operation of the tool when a determined distance to a target is larger than a threshold. In one or more embodiments, the threshold is based, at least in part, on a volume of sensitivity associated with at least one of the first button and the second button. In one or more embodiments, the first button is only excited when the first button has an associated first button sensitivity that is greater than a sensitivity threshold, wherein the second button is only excited when the second button has an associated second button sensitivity greater than the sensitivity threshold, and wherein the sensitivity threshold is based, at least in part, on an inversion performed for a previous logging point. In one or more embodiments, at least one of the first button and the second button comprise an electrode. In one or more embodiments, at least one of the first button and the second button comprise a toroidal winding.

In one or more embodiments, a wellbore drilling system for drilling in a subsurface earth formation comprises a ranging tool coupled to a drill string, a first button recessed within the ranging tool such that a top surface of the first button does not exceed an outer surface of the ranging tool, a first isolation layer that electrically isolates the first button from the ranging tool, a second button recessed within the ranging tool such that a top surface of the second button does not exceed an outer surface of the ranging tool, a second isolation layer that electrically isolates the second button from the ranging tool and an information handling system communicably coupled to the ranging tool, the information handling system comprises a processor and memory device coupled to the processor, the memory device containing a set of instruction that, when executed by the processor, cause the processor to excite the first button of the ranging tool by a first source, receive a first downhole measurement associated with the excitation of the first button, excite a second button of the ranging tool by a second source, receive a second measurement associated with the excitation of the second button, determine at least one of a direction, distance, and orientation to a target based, at least in part, on the first downhole measurement and the second downhole measurement and adjust a drilling parameter based, at least in part, on the determined at least one of the direction, the distance, and the orientation to the target.

In one or more embodiments, the set of instructions further cause the processor to adjust a rotation angle of the first button, excite the first button at the rotation angle, receive a third downhole measurement associated with the excitation of the first button at the rotation angle, and adjust the drilling parameter based, at least in part, on the third downhole measurement. In one or more embodiments, an azimuthal axis of the second button aligns with an azimuthal axis of the first button. In one or more embodiments, the first button and the second button are recessed in a groove of the tool. In one or more embodiments, the set of instructions further cause the processor to compare at least one of a first signal magnitude associated with the first button and a second signal magnitude associated with the second button to a predicted signal magnitude to obtain a first value, wherein the predicted signal magnitude is based, at least in part, on a ranging model, determine a presence of the target based, at least in part, on the first value exceeding a threshold and adjust the drilling parameter based, at least in part, on the determining the presence of the target.

In one or more embodiments, the set of instructions further cause the processor to determine a first weight associated with the first signal magnitude and a second weight associated with the second signal magnitude, determine a regularization value from a regularization function based, at least in part, on the first weight and the second weight, determine a cost value from a cost function based, at least in part, on the regularization value and adjust the drilling parameter based, at least in part, on the cost value. In one or more embodiments, the predicted signal magnitude is based, at least in part, on no target being present. In one or more embodiments, the set of instructions further cause the processor to maintain a non-azimuthal operation of the tool when a determined distance to a target is larger than a threshold. In one or more embodiments, the threshold is based, at least in part, on a volume of sensitivity associated with at least one of the first button and the second button. In one or more embodiments, the first button is only excited when the first button has an associated first button sensitivity that is greater than a sensitivity threshold, wherein the second button is only excited when the second button has an associated second button sensitivity greater than the sensitivity threshold, and wherein the sensitivity threshold is based, at least in part, on an inversion performed for a previous logging point. In one or more embodiments, at least one of the first button and the second button comprise an electrode. In one or more embodiments, at least one of the first button and the second button comprise a toroidal winding.

In one or more embodiments, a non-transitory computer readable medium storing a program that, when executed, causes a processor to excite a first button of a tool by a first source, wherein the tool is coupled to a drill string, wherein the first button is recessed within the tool such that a top surface of the first button does not exceed an outer surface of the tool, and wherein a first isolation layer electrically isolates the first button from the tool, receive a first downhole measurement associated with the excitation of the first button, excite a second button of the tool by a second source, wherein the second button is recessed within the tool such that a top surface of the second button does not exceed the outer surface of the tool, and wherein a second isolation layer electrically isolates the second button from the tool, receive a second downhole measurement associated with the excitation of the second button, determine at least one of a direction, distance, and orientation to a target based, at least in part, on the first downhole measurement and the second downhole measurement and adjust a drilling parameter based, at least in part, on the determined at least one of the direction, the distance, and the orientation to the target.

In one or more embodiments, the program, when executed, causes the processor to adjust a rotation angle of the first button, excite the first button at the rotation angle, receive a third downhole measurement associated with the excitation of the first button at the rotation angle, and adjust the drilling parameter based, at least in part, on the third downhole measurement. In one or more embodiments, an azimuthal axis of the second button aligns with an azimuthal axis of the first button. In one or more embodiments, the first button and the second button are recessed in a groove of the tool. In one or more embodiments, the program, when executed, causes the processor to compare at least one of a first signal magnitude associated with the first button and a second signal magnitude associated with the second button to a predicted signal magnitude to obtain a first value, wherein the predicted signal magnitude is based, at least in part, on a ranging model, determine a presence of the target based, at least in part, on the first value exceeding a threshold and adjust the drilling parameter based, at least in part, on the determining the presence of the target.

In one or more embodiments, the program, when executed, causes the processor to determine a first weight associated with the first signal magnitude and a second weight associated with the second signal magnitude, determine a regularization value from a regularization function based, at least in part, on the first weight and the second weight, determine a cost value from a cost function based, at least in part, on the regularization value and adjust the drilling parameter based, at least in part, on the cost value. In one or more embodiments, the predicted signal magnitude is based, at least in part, on no target being present. In one or more embodiments, the program, when executed, causes the processor to maintain a non-azimuthal operation of the tool when a determined distance to a target is larger than a threshold. In one or more embodiments, the threshold is based, at least in part, on a volume of sensitivity associated with at least one of the first button and the second button. In one or more embodiments, the first button is only excited when the first button has an associated first button sensitivity that is greater than a sensitivity threshold, wherein the second button is only excited when the second button has an associated second button sensitivity greater than the sensitivity threshold, and wherein the sensitivity threshold is based, at least in part, on an inversion performed for a previous logging point. In one or more embodiments, at least one of the first button and the second button comprise an electrode. In one or more embodiments, at least one of the first button and the second button comprise a toroidal winding.

Embodiments and methods of the present disclosure described herein further relate to any one or more of the following paragraphs:

1. A ranging tool for determining a relative position of a target well to a re-entry well, the tool comprising a bottom hole assembly ("BHA") coupled to a drill string; a first electrode positioned along the BHA; a second electrode positioned along the BHA; a plurality of magnetic field receivers spaced circumferentially around the drill string; and an information handling system comprising instructions that, when executed by a processor communicably coupled to the first and second electrodes, causes the information handling system to perform operations comprising: positioning the BHA near a target well; using a firing map, exciting the first and second electrodes to thereby simulate rotation of the BHA, the firing map including parameters used during the excitation of the first and second electrodes; using the receivers, obtaining downhole measurements associated with the excitation of the first and second electrodes; and using the measurements to determine a relative position of the target well to the re-entry well, the relative position comprising at least one of a direction, distance or orientation of the target well relative to the re-entry well.

2. The ranging tool as defined by paragraph 1, wherein the first and second electrodes are located on a same axial plane and equally spaced apart from one another around a circumference of the BHA, thereby forming an electrode ring.

3. The ranging tool as defined in paragraphs 1 or 2, further comprising a plurality of electrode rings axially separated along an axis of the BHA.

4. The ranging tool as defined in any of paragraphs 1 to 3, wherein the electrode ring comprises at least four electrodes circumferentially spaced apart at equal distances from each other around the BHA, each electrode being assigned a quadrant identifier.

5. The ranging tool as defined in any of paragraphs 1 to 5, wherein: the information handling system excites the first and second electrodes while the BHA is not rotating; or the information handling system excites the first and second electrodes while the BHA is rotating.

6. The ranging tool as defined in any of paragraphs 1 to 6, wherein the first and second electrodes obtain formation resistivity measurements.

7. The ranging tool as defined in any of paragraphs 1 to 7, wherein the firing map sequence parameters comprise at least one of a current injection amplitude, firing duration, firing frequency, or current injection frequency.

8. The ranging tool as defined in any of paragraphs 1 to 7, wherein the firing map sequence parameters are prepopulated based on preplanned well data.

9. The ranging tool as defined in any of paragraphs 1 to 8, where the first and second electrodes are installed in stabilizer blades coupled to the BHA.

10. The ranging tool as defined in any of paragraphs 1 to 9, wherein the firing map contains one or more timing rings.

11. The ranging tool as defined in any of paragraphs 1 to 10, wherein the downhole measurements are absolute magnetic field measurements or gradient magnetic field measurements.

12. A ranging method for determining a relative position of a target well to a re-entry well, the method comprising: positioning a bottom hole assembly ("BHA") of a drill string near a target well, the BHA comprising a first electrode, second electrode, and plurality of magnetic field receivers spaced circumferentially around the drill string; using a firing map, exciting the first and second electrodes to thereby simulate rotation of the BHA, the firing map including parameters used during the excitation of the first and second electrodes; using the receivers, obtaining downhole measurements associated with the excitation of the first and second electrodes; and using the measurements to determine a relative position of the target well to the re-entry well, the relative position comprising at least one of a direction, distance or orientation of the target well relative to the re-entry well.

13. The ranging method as defined by paragraph 12, further comprising exciting the first and second electrodes while the drill string is not rotating.

14. The ranging method as defined in paragraphs 12 or 13, further comprising: obtaining an absolute magnetic field measurement or a gradient magnetic field measurement using the electrodes; or obtaining formation resistivity measurements using the electrodes.

15. The ranging method as defined in any of paragraphs 12 to 14, further comprising: firing the first and second electrodes sequentially to simulate the rotation; or firing axially separated electrode rings to simulate virtual axial movement of the drill string, the electrode rings being axially separated along an axis of the drill string.

16. The ranging method as defined in any of paragraphs 12 to 15, further comprises selecting a firing map timing ring to adjust a firing frequency and firing duration for the first and second electrodes to adjust a simulated drill string revolutions per minute.

17. The ranging method as defined in any of paragraphs 12 to 16, further comprising updating the firing map in real-time during the re-entry operation.

18. A ranging method for determining a relative position of a target well to a re-entry well, the method comprising: positioning a bottom hole assembly ("BHA") of a drill string near the target well, the BHA comprising electrodes and receivers; exciting the electrodes to simulate rotation of the BHA; obtaining downhole measurements associated with the excitation of the electrodes; and using the measurements to determine a relative position of the target well to the re-entry well.

19. The ranging method as defined in claim 19, wherein a firing map is used to control excitation of the electrodes, the firing map having parameters associated with at least one of a firing frequency, current injection amplitude, firing duration, current injection frequency, or firing timing of the electrodes.

20. The ranging method as defined in claim 18 or 19, wherein: the electrodes are located on a same axial plane and equally spaced apart from one another around a circumference of the BHA, thereby forming an electrode ring; and the method further comprises firing electrode rings axially separated along an axis of the BHA to thereby simulate virtual axial movement of the BHA.

Furthermore, the illustrative methods described herein may be implemented by a system comprising processing circuitry that can include a non-transitory computer readable medium comprising instructions which, when executed by at least one processor of the processing circuitry, causes the processor to perform any of the methods described herein.

Although various embodiments have been shown and described, the disclosure is not limited to such embodiments and will be understood to include all modifications and variations as would be apparent to one skilled in the art. For example, the methods and embodiments described herein may be used in a variety of ranging applications other than re-entry operations. Therefore, it should be understood that the disclosure is not intended to be limited to the particular forms disclosed; rather, the intention is to cover all modifications, equivalents, and alternatives falling within the spirit and scope of the disclosure as defined by the appended claims.

What is claimed is:

1. A ranging tool for determining a relative position of a target well to a re-entry well, the tool comprising:
a bottom hole assembly ("BHA") coupled to a drill string;
a first electrode positioned along the BHA;
a second electrode positioned along the BHA;
a plurality of magnetic field receivers spaced circumferentially around the drill string; and
an information handling system comprising instructions that, when executed by a processor communicably coupled to the first and second electrodes, causes the information handling system to perform operations comprising:
positioning the BHA near a target well;
using a firing map, exciting the first and second electrodes to thereby simulate rotation of the BHA, the firing map including parameters used during the excitation of the first and second electrodes;
using the receivers, obtaining downhole measurements associated with the excitation of the first and second electrodes; and
using the measurements to determine a relative position of the target well to the re-entry well, the relative position comprising at least one of a direction, distance or orientation of the target well relative to the re-entry well.

2. The ranging tool as defined by claim 1, wherein the first and second electrodes are located on a same axial plane and equally spaced apart from one another around a circumference of the BHA, thereby forming an electrode ring.

3. The ranging tool as defined by claim 2, further comprising a plurality of electrode rings axially separated along an axis of the BHA.

4. The ranging tool as defined by claim 2, wherein the electrode ring comprises at least four electrodes circumferentially spaced apart at equal distances from each other around the BHA, each electrode being assigned a quadrant identifier.

5. The ranging tool as defined in claim 1, wherein:
the information handling system excites the first and second electrodes while the BHA is not rotating; or
the information handling system excites the first and second electrodes while the BHA is rotating.

6. The ranging tool as defined by claim 1, wherein the first and second electrodes obtain formation resistivity measurements.

7. The ranging tool as defined by claim 1, wherein the firing map sequence parameters comprise at least one of a current injection amplitude, firing duration, firing frequency, or current injection frequency.

8. The ranging tool as defined by claim 7, wherein the firing map sequence parameters are prepopulated based on preplanned well data.

9. The ranging tool as defined by claim 1, where the first and second electrodes are installed in stabilizer blades coupled to the BHA.

10. The ranging tool as defined by claim 1, wherein the firing map contains one or more timing rings.

11. The ranging tool as defined by claim 1, wherein the downhole measurements are absolute magnetic field measurements or gradient magnetic field measurements.

12. A ranging method for determining a relative position of a target well to a re-entry well, the method comprising:
positioning a bottom hole assembly ("BHA") of a drill string near a target well, the BHA comprising a first electrode, second electrode, and plurality of magnetic field receivers spaced circumferentially around the drill string;
using a firing map, exciting the first and second electrodes to thereby simulate rotation of the BHA, the firing map including parameters used during the excitation of the first and second electrodes;
using the receivers, obtaining downhole measurements associated with the excitation of the first and second electrodes; and
using the measurements to determine a relative position of the target well to the re-entry well, the relative position comprising at least one of a direction, distance or orientation of the target well relative to the re-entry well.

13. The ranging method as defined by claim 12, further comprising exciting the first and second electrodes while the drill string is not rotating.

14. The ranging method as defined by claim 12, further comprising:
obtaining an absolute magnetic field measurement or a gradient magnetic field measurement using the electrodes; or
obtaining formation resistivity measurements using the electrodes.

15. The ranging method as defined by claim 12, further comprising:
firing the first and second electrodes sequentially to simulate the rotation; or
firing axially separated electrode rings to simulate virtual axial movement of the drill string, the electrode rings being axially separated along an axis of the drill string.

16. The ranging method as defined by claim 12, further comprises selecting a firing map timing ring to adjust a firing frequency and firing duration for the first and second electrodes to adjust a simulated drill string revolutions per minute.

17. The ranging method as defined by claim 12, further comprising updating the firing map in real-time during the re-entry operation.

18. A ranging method for determining a relative position of a target well to a re-entry well, the method comprising:
positioning a bottom hole assembly ("BHA") of a drill string near the target well, the BHA comprising electrodes and receivers;
exciting the electrodes to simulate rotation of the BHA;
obtaining downhole measurements associated with the excitation of the electrodes; and
using the measurements to determine a relative position of the target well to the re-entry well,
wherein:
the electrodes are located on a same axial plane and equally spaced apart from one another around a circumference of the BHA, thereby forming an electrode ring; and
the method further comprises firing electrode rings axially separated along an axis of the BHA to thereby simulate virtual axial movement of the BHA.

19. The ranging method as defined in claim 18, wherein a firing map is used to control excitation of the electrodes, the firing map having parameters associated with at least one of a firing frequency, current injection amplitude, firing duration, current injection frequency, or firing timing of the electrodes.

* * * * *